(12) United States Patent
Emmanuel et al.

(10) Patent No.: US 10,805,613 B2
(45) Date of Patent: Oct. 13, 2020

(54) SYSTEMS AND METHODS FOR OPTIMIZATION AND TESTING OF WIRELESS DEVICES

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 16/278,576

(22) Filed: Feb. 18, 2019

(65) Prior Publication Data

US 2019/0260488 A1    Aug. 22, 2019

Related U.S. Application Data

(60) Provisional application No. 62/633,017, filed on Feb. 20, 2018.

(51) Int. Cl.
*H04N 19/166* (2014.01)
*H04N 19/103* (2014.01)
(Continued)

(52) U.S. Cl.
CPC .......... *H04N 19/166* (2014.11); *G06F 9/542* (2013.01); *G06K 9/00771* (2013.01); *G06T 7/20* (2013.01);
(Continued)

(58) Field of Classification Search
CPC .......... G01R 29/0821; G01R 29/0835; G01R 31/001; G08B 13/19695; G08B 13/191; G08B 13/193; G08B 13/19656; G08B 13/1966; G08B 13/19669; G08B 21/182; G08B 27/006; G08B 29/183; G08B 3/10; G08B 3/1016; G08B 5/223; H04N 7/181; H04N 17/002; H04N 19/00; H04N 19/103; H04N 19/124; H04N 19/156;
(Continued)

(56) References Cited

U.S. PATENT DOCUMENTS 7,539,489 B1 * 5/2009 Alexander ............ H04W 24/06
455/423
8,855,035 B2 10/2014 Lemoine et al.
(Continued)

FOREIGN PATENT DOCUMENTS

CN    106534634 A    3/2017
CN    106954026 A    7/2017
(Continued)

*Primary Examiner* — Devan A Sandiford
(74) *Attorney, Agent, or Firm* — Perkins Coie LLP

(57) ABSTRACT

Disclosed are methods and systems for the testing and optimization of one or more wireless devices, e.g., wireless cameras, such as in conjunction with corresponding systems. Wireless device test capabilities include any of: single device, wireless video rate/delay/interference test; multi-security camera system wireless DC power range tweet with and without noise/interference; security camera system image quality with and without movement in day and night mode; multi-camera wireless range vs. DC power tweet with and without interference; WLAN beacon/sniffer automation; wireless audio range testing; security camera uplink testing; and optical synchronized video/audio distribution (optical fiber).

28 Claims, 28 Drawing Sheets

(51) Int. Cl.
| | |
|---|---|
| H04N 19/124 | (2014.01) |
| H04N 19/156 | (2014.01) |
| H04N 19/184 | (2014.01) |
| H04N 19/40 | (2014.01) |
| H04N 19/42 | (2014.01) |
| H04B 17/318 | (2015.01) |
| H04B 17/391 | (2015.01) |
| H04N 5/232 | (2006.01) |
| H05B 47/19 | (2020.01) |
| G07C 9/37 | (2020.01) |
| H05B 47/105 | (2020.01) |
| G06F 9/54 | (2006.01) |
| G06K 9/00 | (2006.01) |
| G06T 7/20 | (2017.01) |
| G08B 3/10 | (2006.01) |
| G08B 5/22 | (2006.01) |
| G08B 13/191 | (2006.01) |
| G08B 13/193 | (2006.01) |
| G08B 13/196 | (2006.01) |
| G08B 21/18 | (2006.01) |
| G08B 27/00 | (2006.01) |
| G08B 29/18 | (2006.01) |
| H04L 1/00 | (2006.01) |
| H04L 5/00 | (2006.01) |
| H04L 12/26 | (2006.01) |
| H04L 29/06 | (2006.01) |
| H04L 29/08 | (2006.01) |
| H04N 5/247 | (2006.01) |
| H04N 7/12 | (2006.01) |
| H04N 7/18 | (2006.01) |
| H04N 17/00 | (2006.01) |
| H04W 24/08 | (2009.01) |
| H04W 24/10 | (2009.01) |
| H04W 28/02 | (2009.01) |
| H04W 36/00 | (2009.01) |
| H04W 36/30 | (2009.01) |
| H04W 52/02 | (2009.01) |
| H04W 72/04 | (2009.01) |
| H04N 7/14 | (2006.01) |
| H04N 19/00 | (2014.01) |

(52) U.S. Cl.
CPC ............... *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/1966* (2013.01); *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC .... H04N 19/166; H04N 19/184; H04N 19/40; H04N 19/42; H04N 5/23206; H04N 5/23227; H04N 5/23254; H04N 5/247; H04N 7/12; H04N 7/147; H04N 7/183; H04B 17/391; H04B 17/318; H04B 17/373; G06F 9/542; G06K 9/00771; G06T 2207/30232; G06T 2207/30241; G06T 7/20; G07C 9/00158; H04L 1/0003; H04L 1/0009; H04L 1/0017; H04L 1/0033; H04L 41/16; H04L 43/0817; H04L 43/0858; H04L 43/0888; H04L 43/12; H04L 43/16; H04L 5/0053; H04L 65/4069; H04L 65/4084; H04L 65/608; H04L 65/80; H04L 67/1093; H04W 24/08; H04W 24/10; H04W 28/021; H04W 36/0011; H04W 36/30; H04W 52/0245; H04W 52/0261; H04W 72/042; H04W 72/0453; H05B 37/0227; H05B 37/0272

See application file for complete search history.

(56) References Cited

U.S. PATENT DOCUMENTS

| | | |
|---|---|---|
| 9,179,495 B1 | 11/2015 | Scherzer et al. |
| 9,451,484 B2 * | 9/2016 | Boulton ............... G01S 5/0221 |
| 9,712,814 B2 * | 7/2017 | Tanaka .................. H04N 5/361 |
| 10,033,436 B2 * | 7/2018 | Thubert ............... H04B 5/0037 |
| 10,044,104 B1 * | 8/2018 | Bartko .................. H01Q 1/125 |
| 10,177,965 B1 | 1/2019 | Joshi et al. |
| 10,425,638 B2 * | 9/2019 | Yu ......................... G06K 9/6211 |
| 2002/0059627 A1 | 5/2002 | Islam et al. |
| 2002/0105921 A1 * | 8/2002 | Sawyer .................. H04L 43/00 370/328 |
| 2002/0181637 A1 | 12/2002 | Nakabayashi |
| 2003/0055908 A1 | 3/2003 | Brown et al. |
| 2003/0063277 A1 * | 4/2003 | Kennedy .............. G01B 11/27 356/400 |
| 2003/0193525 A1 * | 10/2003 | Nygaard, Jr. ......... G06F 3/0482 715/810 |
| 2005/0086569 A1 | 4/2005 | Hiddink et al. |
| 2005/0169209 A1 | 8/2005 | Miu et al. |
| 2008/0020746 A1 * | 1/2008 | Alexandar ............ H04W 24/06 455/423 |
| 2008/0025378 A1 | 1/2008 | Mahany et al. |
| 2008/0026748 A1 * | 1/2008 | Alexander ............ H04W 24/06 455/432.1 |
| 2008/0112315 A1 | 5/2008 | Hu et al. |
| 2009/0022222 A1 | 1/2009 | He et al. |
| 2009/0273679 A1 * | 11/2009 | Gere ...................... H04N 9/045 348/187 |
| 2009/0290019 A1 | 11/2009 | McNelis et al. |
| 2010/0080205 A1 | 4/2010 | Hirsch et al. |
| 2010/0097472 A1 | 4/2010 | Chathukutty et al. |
| 2010/0109934 A1 | 5/2010 | Drake et al. |
| 2010/0285753 A1 * | 11/2010 | Foegelle ............... H04B 17/3911 455/67.12 |
| 2012/0314875 A1 | 12/2012 | Lee et al. |

(56) References Cited

U.S. PATENT DOCUMENTS

| | | |
|---|---|---|
| 2013/0021912 A1* | 1/2013 | Finlow-Bates ......... G01S 5/021 370/241 |
| 2013/0053653 A1 | 2/2013 | Cuddihy et al. |
| 2014/0051379 A1 | 2/2014 | Ganesh et al. |
| 2014/0064120 A1 | 3/2014 | Sethuraman et al. |
| 2014/0092755 A1 | 4/2014 | Van De Ven et al. |
| 2014/0115114 A1 | 4/2014 | Garmark et al. |
| 2014/0169195 A1 | 6/2014 | Hsin et al. |
| 2014/0169509 A1* | 6/2014 | Tsofe ..................... H01Q 3/267 375/344 |
| 2014/0240491 A1* | 8/2014 | Kauniskangas ...... H04N 17/002 348/135 |
| 2014/0269655 A1 | 9/2014 | Du et al. |
| 2014/0307707 A1 | 10/2014 | Mestanov et al. |
| 2015/0185857 A1 | 7/2015 | Jung |
| 2015/0229426 A1* | 8/2015 | Yu .......................... H04B 7/026 370/329 |
| 2015/0319411 A1 | 11/2015 | Kasmir et al. |
| 2015/0349859 A1* | 12/2015 | Emmanuel ............ H04W 24/06 375/224 |
| 2015/0381310 A1 | 12/2015 | Hammarwall et al. |
| 2016/0105644 A1 | 4/2016 | Smith et al. |
| 2016/0114887 A1 | 4/2016 | Zhou et al. |
| 2016/0125714 A1 | 5/2016 | Kates et al. |
| 2016/0165620 A1 | 6/2016 | Dagen et al. |
| 2016/0278104 A1 | 9/2016 | Hiremath et al. |
| 2016/0337243 A1 | 11/2016 | Cui et al. |
| 2016/0366702 A1 | 12/2016 | Baba et al. |
| 2017/0055179 A1* | 2/2017 | Radunovic ............ H04W 24/08 |
| 2017/0070732 A1* | 3/2017 | Roulet ................. H04N 17/002 |
| 2017/0078242 A1 | 3/2017 | Nakamura et al. |
| 2017/0180442 A1 | 6/2017 | Lawrence |
| 2017/0237673 A1 | 8/2017 | Law |
| 2017/0242129 A1* | 8/2017 | Kallankari ......... G01R 29/0821 |
| 2017/0244712 A1 | 8/2017 | Meredith et al. |
| 2017/0301201 A1 | 10/2017 | Siann et al. |
| 2018/0306904 A1* | 10/2018 | Vacanti ................. G01S 7/4056 |
| 2018/0375594 A1* | 12/2018 | Kildal ................. H04B 17/102 |
| 2019/0014388 A1 | 1/2019 | Rutledge et al. |
| 2019/0132371 A1 | 5/2019 | Bhat et al. |
| 2019/0162769 A1* | 5/2019 | Zhao ..................... H05K 1/181 |
| 2019/0202657 A1* | 7/2019 | Li ........................ B66B 1/3461 |
| 2019/0222897 A1 | 7/2019 | Frusina et al. |
| 2019/0261370 A1 | 8/2019 | Amini et al. |
| 2019/0282897 A1 | 9/2019 | Posin |
| 2019/0364505 A1 | 11/2019 | Wang et al. |

FOREIGN PATENT DOCUMENTS

| | | | |
|---|---|---|---|
| JP | 2010232819 A | 10/2010 | |
| WO | WO-2006075052 A1 * | 7/2006 | ............... G03H 1/22 |
| WO | WO-2009048660 A2 * | 4/2009 | ............. F41G 7/002 |

\* cited by examiner

|  | Primary Rate | MCS8 (X1 times) |
|---|---|---|
|  | Fallback Rate | MCS7 (X2 times) |
|  | Fallback Rate | MCS5 (X3 times) |
| Extended ladder | Fallback Rate | MCS3 (X4 times) |
| Extended ladder | Fallback Rate | MCS1 (X5 times) |
|  |  | 1 Mbps(X times) |

Adjusting Primary Rate based on RSSI
Less Aggressive on Probing Higher Rates
Keeping History
RSSI Calibration Antenna Diversity Interference Mitigation Band Steering Data FIFO _Aggregation_

Real Time Operating System Adjustments

700

*FIG. 16*

SYSTEMS AND METHODS FOR OPTIMIZATION AND TESTING OF WIRELESS DEVICES

CROSS REFERENCE TO RELATED APPLICATIONS

This Application claims priority to U.S. Provisional App. No. 62/633,017, filed 20 Feb. 2018, which is incorporated herein in its entirety by this reference thereto.

FIELD OF THE INVENTION

At least one embodiment of the present invention pertains to systems and corresponding methods for optimization and testing of wireless devices. At least one specific embodiment of the present invention pertains to systems and processes for optimization and testing of wireless cameras, such as within a system that includes a wireless access point or base station.

BACKGROUND

Surveillance cameras help improve security, but wireless cameras can be less than reliable because they run on batteries and, as such, can drain the batteries quickly.

Surveillance cameras for home or business security applications can include an infrared (IR) sensor and an image sensor, such as a complementary metal-oxide-semiconductor (CMOS) image sensor (or charge-coupled device (CCD) image sensor). The IR sensor can be used to detect motion in an infrared portion of the electromagnetic spectrum, for example, wavelengths of 700 nanometers (nm) to 1 millimeter (mm). If motion is detected using the IR sensor, then the IR sensor can provide a signal to a microcontroller which, upon receiving the signal, can turn on the image sensor and other components of the camera, such that video in the visible light portion of the electromagnetic spectrum, for example, wavelengths of 400 nm to 700 nm, can be recorded using the CMOS or CCD image sensor.

Furthermore, because such surveillance cameras are wireless, the input and/or output signals of these cameras are subject to interference, such as due to environmental factors and/or network congestion.

BRIEF DESCRIPTION OF THE DRAWINGS

One or more embodiments of the present invention are illustrated by way of example and not limitation in the figures of the accompanying drawings, in which like references indicate similar elements.

FIG. 16 is a chart showing Illustrative rate control parameters.

DETAILED DESCRIPTION

References in this description to "an embodiment", "one embodiment", or the like, mean that the particular feature, function, structure or characteristic being described can be included in at least one embodiment of the present invention. Occurrences of such phrases in this specification do not necessarily all refer to the same embodiment. On the other hand, the embodiments referred to also are not necessarily mutually exclusive.

Various illustrative embodiments will now be described. The following description provides certain specific details for a thorough understanding and enabling description of these examples. One skilled in the relevant technology will understand, however, that some of the disclosed illustrative embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Optimization and Testing of Wireless Devices

Various embodiments of the invention concern the testing and optimization of wireless devices and, in particular, various embodiments of the invention provide systems, methods and other techniques for the testing and optimization of wireless cameras, sensors, and corresponding systems.

Figure 1:
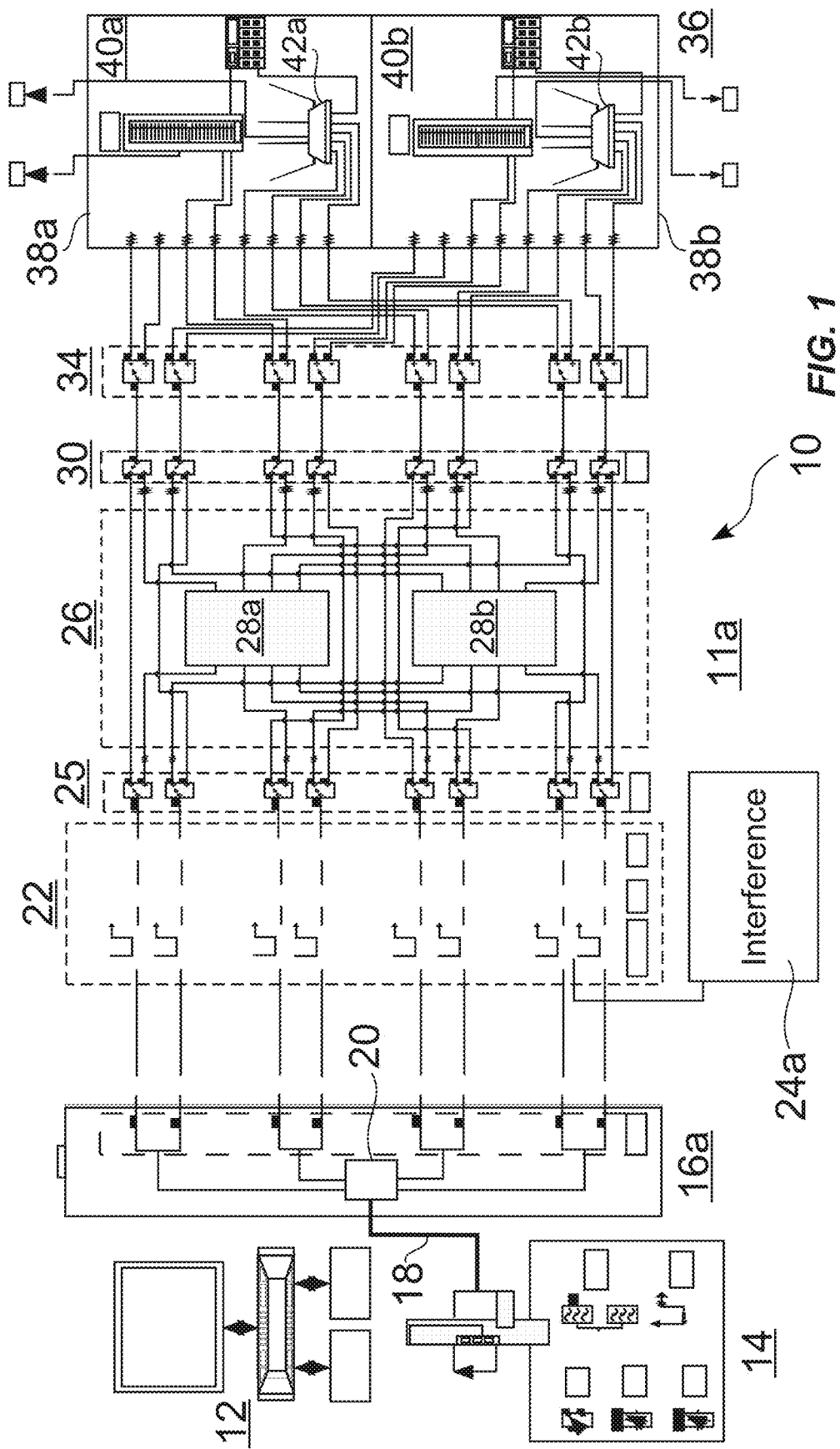
FIG. 1 is a block diagram showing a Video RF Conducted Rate vs Range 4×4 Tester.

FIG. 1 is a block diagram 10 of an illustrative testing system 11, e.g., 11a, for video RF Conducted Rate vs Range 4×4 testing 900 (FIG. 22), such as for testing of any of delay and link budget/dynamic range, such as under conditions having no wireless interference, and/or under conditions having wireless interference 24, e.g., 24a. In some embodiments, the test system 11 can be used to conduct tests for verifying the transmission of wireless signals, e.g., video signals 806, e.g., 806a,806b (FIG. 19) over one or more wireless channels. For instance, the test system 11 can be used for verifying the transmission and/or reception of wireless signals and video hardware at a first stage of verification and optimization.

Figure 2:
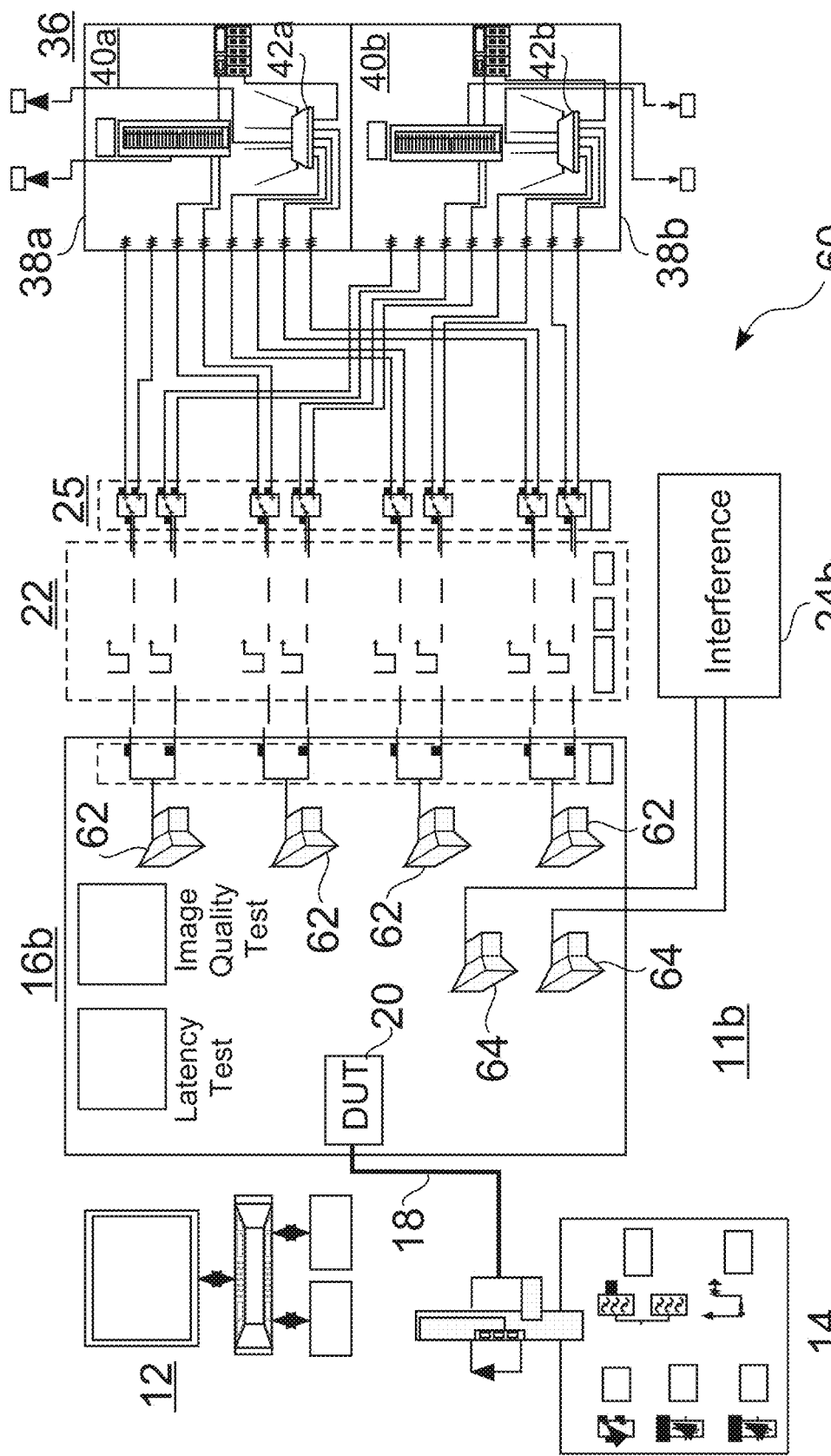
FIG. 2 is a block diagram showing a Video Wireless OTA Rate vs Range 4×4 Tester.
Figure 24:
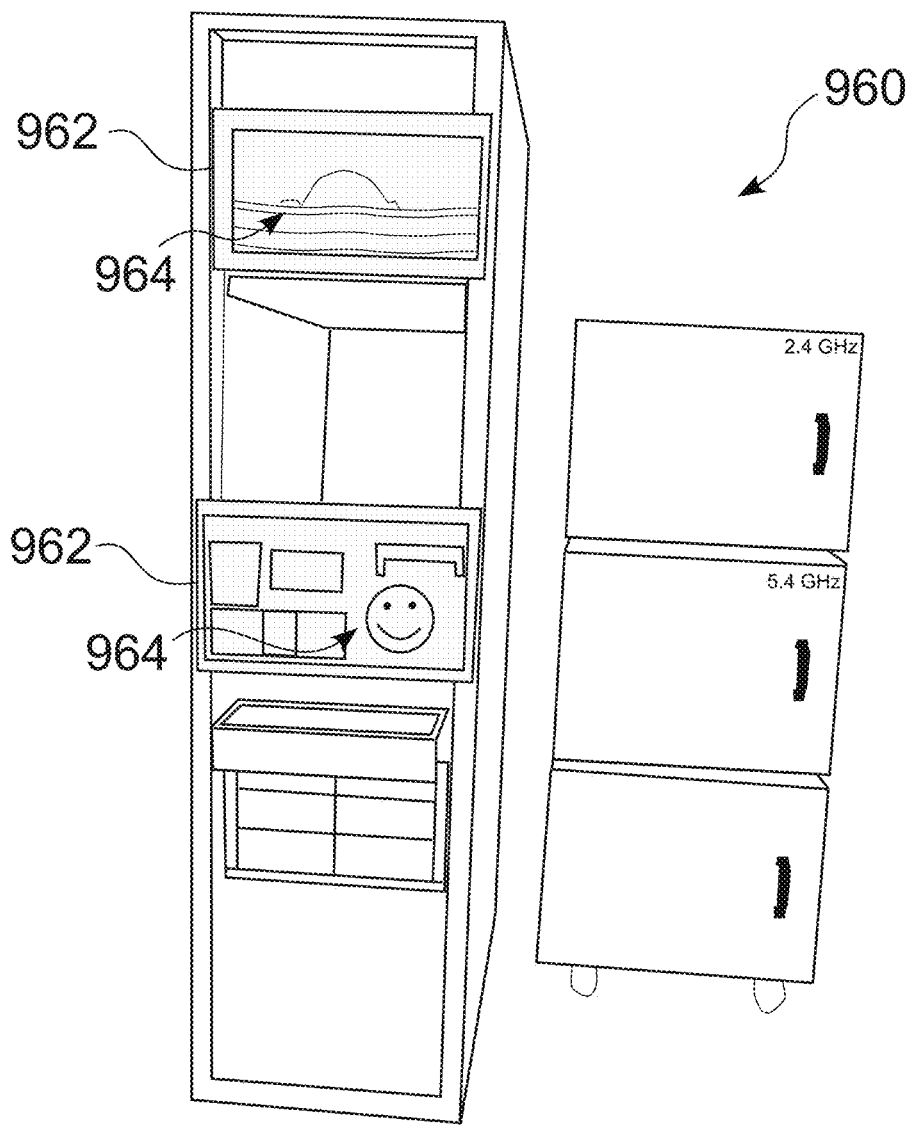
FIG. 24 is a first view of an illustrative remote alarm system (RAS) wireless RvR setup for wireless camera testing.

FIG. 2 is a block diagram 60 showing an illustrative Video Wireless OTA Rate vs Range 4×4 Test system 11b, such as for wireless over the air (OTA) testing of a wireless device 20, e.g., a wireless camera 20, for any of delay and link budget/dynamic range, such as under conditions having no wireless interference, and/or under conditions having wireless Interference 24, e.g., 24b. In some embodiments, the illustrative test system 11b can be configured to perform wireless OTA testing that emulates real world conditions for wireless cameras and other sensors, and can be used to optimize wireless and video parameters at one or more wireless cameras and at a base station. Wireless L1 and L2 parameters are optimized to achieve the throughput (TPUT) and latency requirement for a specific type of video (2k, 4k, etc.). In some embodiments, the wireless camera 20 in this test setup can be pointed to different scenes, while video parameters can be optimized for different scenes, at different attenuations. In some embodiments, the scenes can be real objects, or video 964 (FIG. 24) that is played on a TV 962 (FIG. 24). As well, some embodiments, different lighting can be implemented for different test setups.

Figure 3:
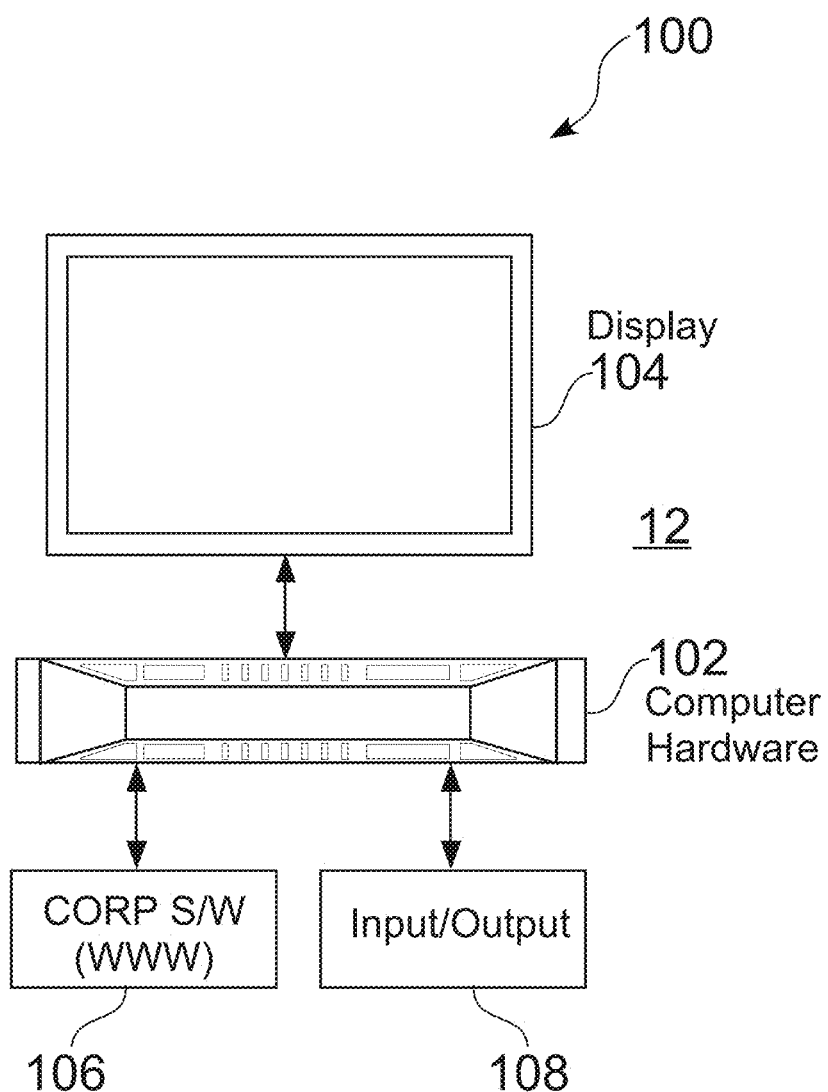
FIG. 3 is a schematic diagram of an illustrative computer associated with a DUT 4×4 Tester.

The test systems 11a and 11b seen in FIG. 1 and FIG. 2 typically include a computer system 12, such as for any of setting and/or changing test parameters, test monitoring, data collection, test analysis and reporting, or any combination thereof. FIG. 3 is a schematic diagram 100 of an illustrative computer system 12 for a DUT 4×4 tester 11, such as including a computer 102 having an associated processor and memory, a display 104, local or networked access to software 106, and associated input/output 108.

Figure 4:
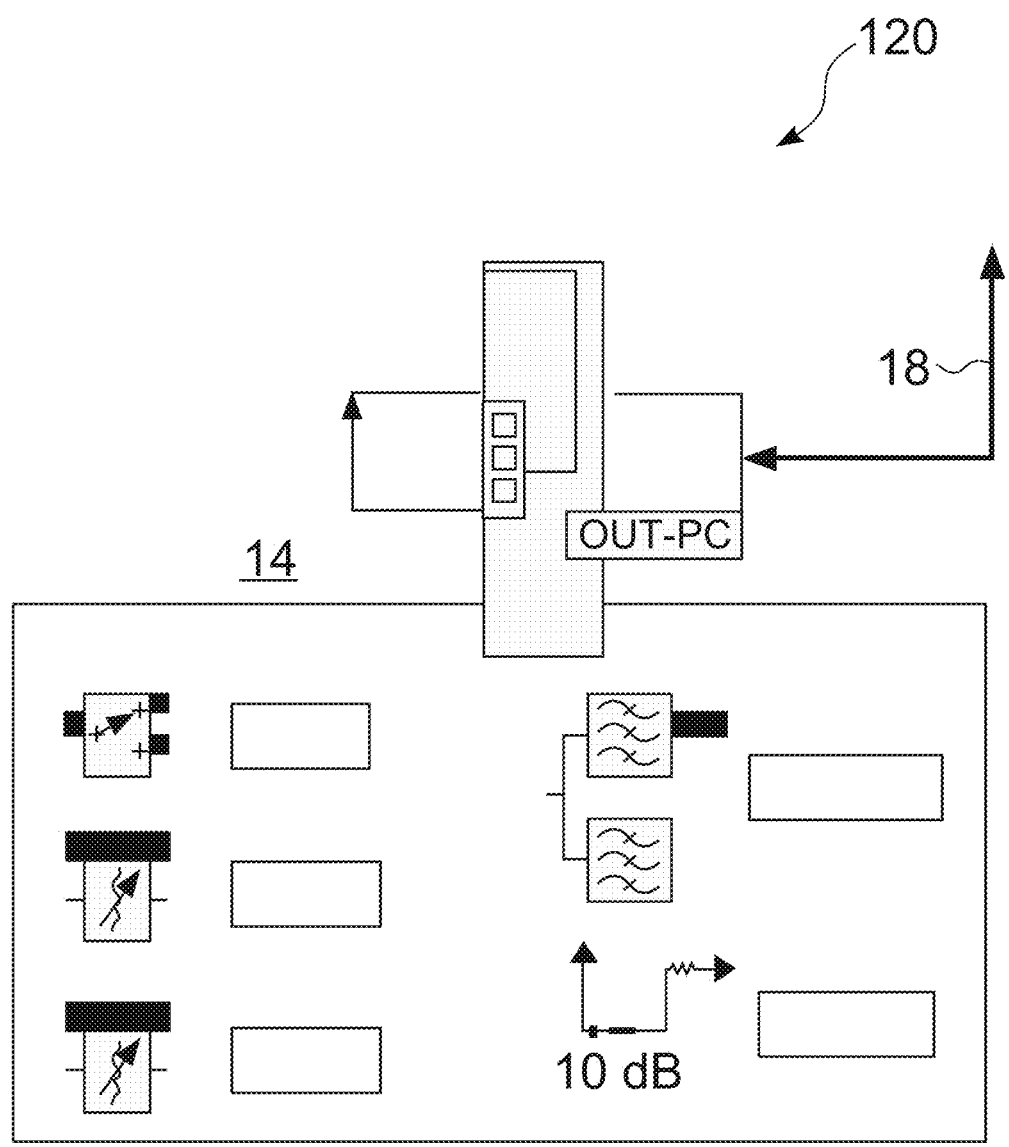
FIG. 4 is a schematic diagram of an illustrative DUT interconnection module for a DUT 4×4 Tester.

The test systems 11a and 11b seen in FIG. 1 and FIG. 2 also typically include a DUT test module and controller 14, such as to set or modify one or more parameters for a device under test (DUT) 20, e.g., one or more wireless cameras 20, and/or to collect and analyze data from the DUT 20. FIG. 4 is a schematic view 120 of an illustrative DUT test module and controller 14 for connection 18 a DUT 4×4 Tester 10.

Figure 5:
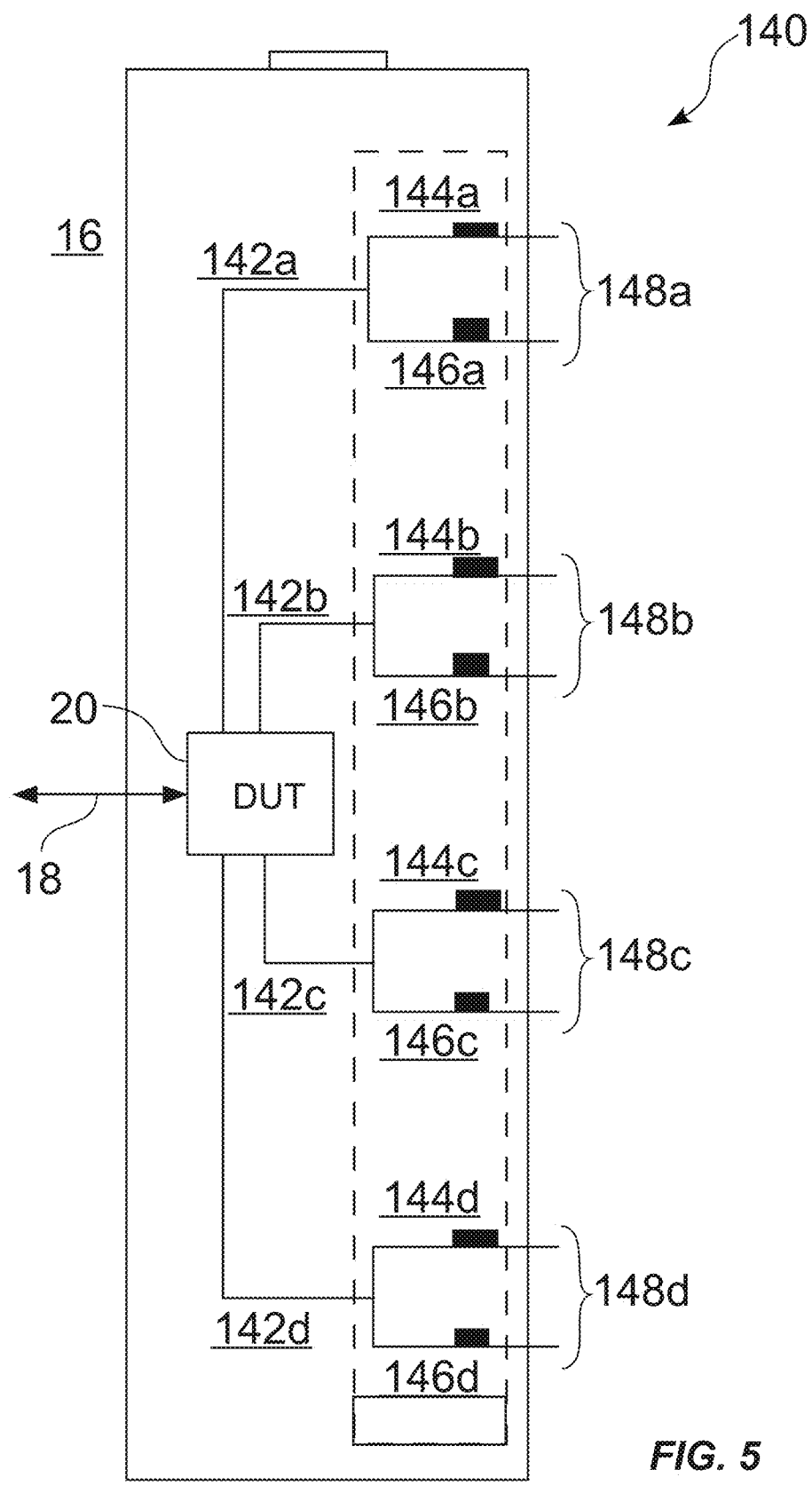
FIG. 5 is a schematic diagram of an illustrative DUT test configuration for a Video RF Conducted Rate vs Range 4×4 Tester.

The illustrative test system 11a seen in FIG. 1 includes a test chamber 16, e.g., 16a, for placement and testing of a DUT 20, such as when connected 18 to the DUT test module and controller 14. FIG. 5 is a schematic diagram 140 of an illustrative DUT test configuration 16 for a Video RF Conducted Rate vs Range 4×4 Tester 11a, such as for testing and/or optimization of a wireless camera 20. The illustrative test chamber 16 seen in FIG. 5 includes 4 channels 142, e.g., 142a-142d, connected to a DUT 20, wherein each of the four channels 142 has an associated wireless input 144, e.g., one of corresponding wireless inputs 144a-144d, and an associated wireless output 146, e.g., one of corresponding wireless inputs 146a-146d, thereby providing a corresponding wireless input/output pair, e.g., one of 148a-148d for each of the four DUT channels 142a-142d.

The illustrative test system 11b seen in FIG. 2 includes a test chamber 16, e.g., 16b, for placement and testing of a DUT 20, such as when connected 18 to the DUT test module and controller 14. The illustrative test chamber seen in FIG. 2 also includes antennas 62 for multiple channels, and one or more interference antennas 64.

Figure 6:
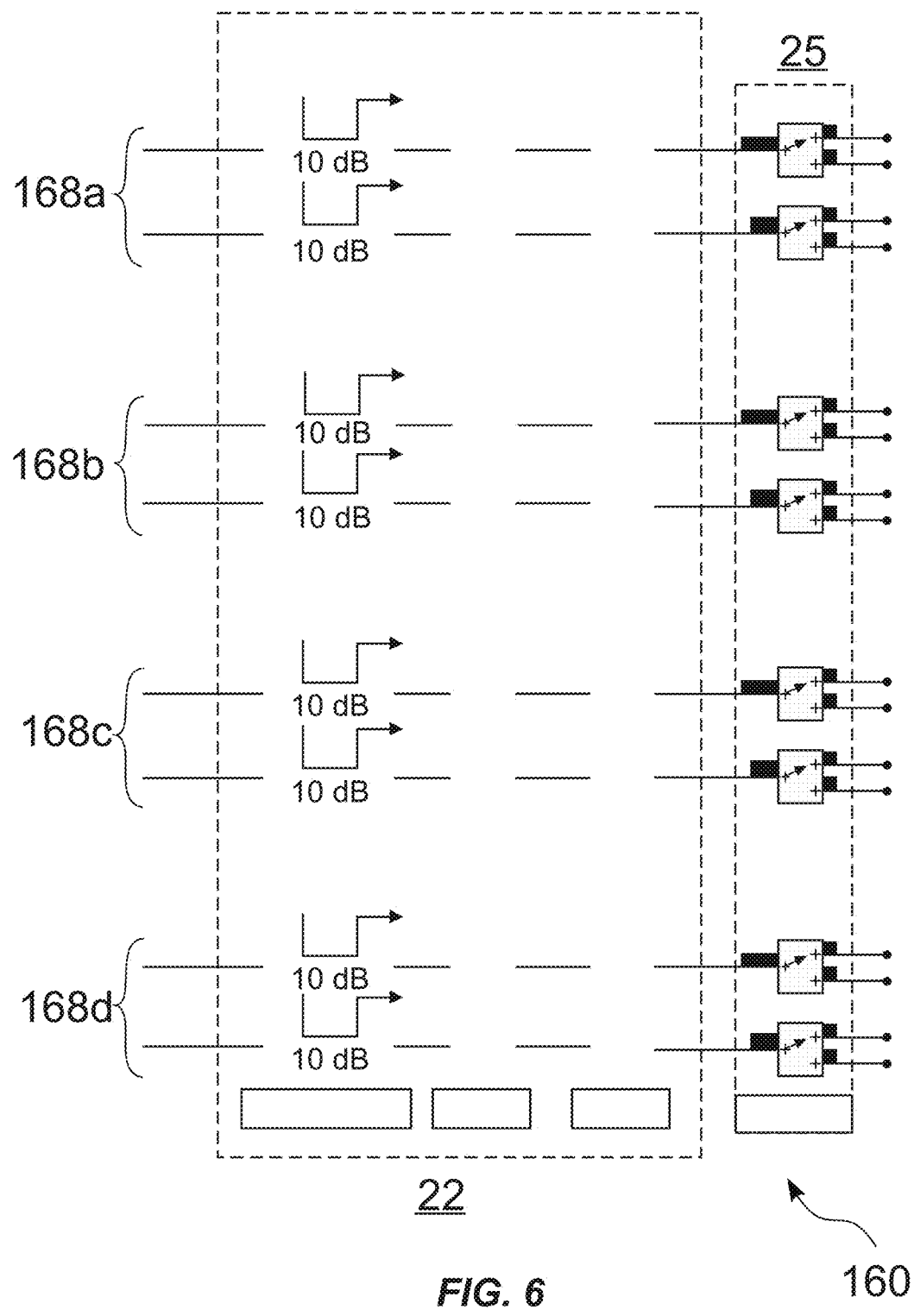
FIG. 6 is a schematic diagram of an illustrative signal processing module for a 4×4 DUT Tester.

The illustrative DUT test systems 11a and 11b seen in FIG. 1 and FIG. 2 also include a signal processing module 22 and interconnection 25, such as to send and receive signals corresponding to each of the four DUT channels 142a-142d. FIG. 6 is a schematic view 160 of an illustrative signal processing module 22 and interconnection 25 for a DUT 4×4 Tester 10.

Figure 7:
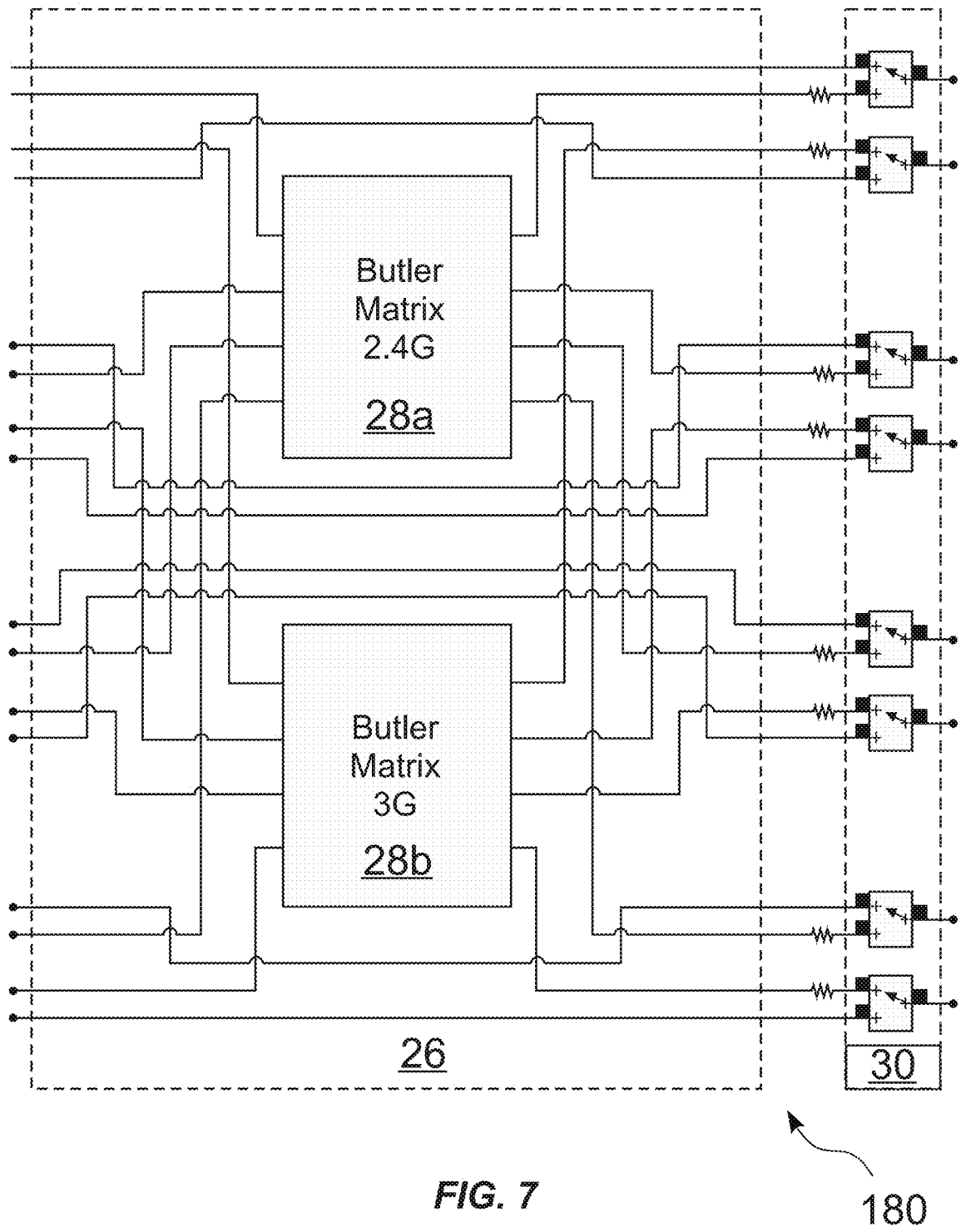
FIG. 7 is a schematic diagram of an illustrative beam steering module for a Video RF Conducted Rate vs Range 4×4 DUT Tester.

The illustrative Video RF Conducted Rate vs Range 4×4 DUT test system 11a seen in FIG. 1 also includes a beam steering module 26 and interconnection 30. FIG. 7 is a schematic diagram 180 of an illustrative beam steering module 26 and interconnection 30 for a Video RF Conducted Rate vs Range 4×4 DUT Tester 11a, such as including one or more beam-forming networks 28, e.g., a 2.4G Butler matrix 28a and a 3G Butler matrix 28b.

Figure 8:
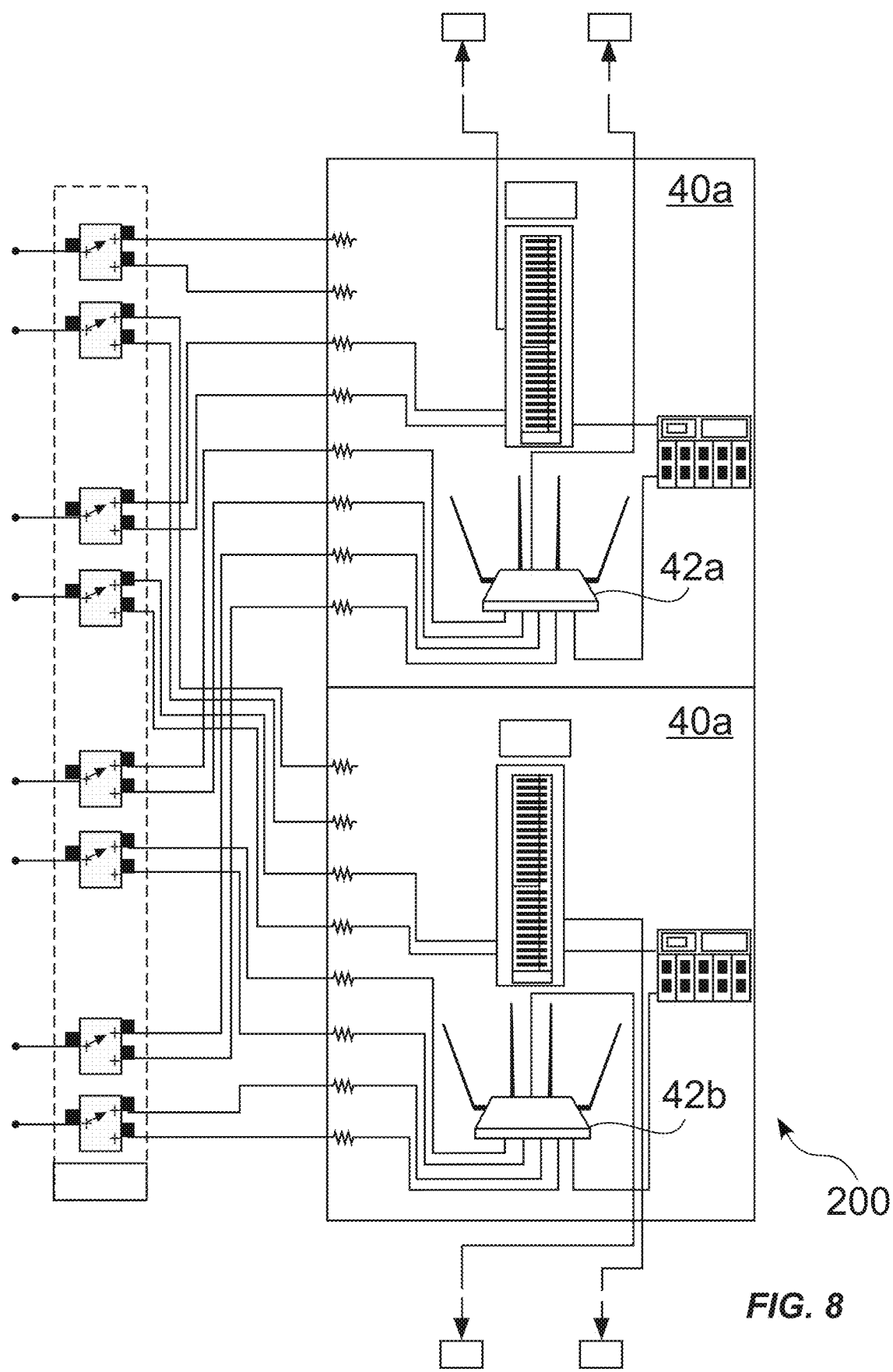
FIG. 8 is a schematic diagram of illustrative wireless access point chambers used for a 4×4 DUT Tester.

The illustrative DUT test systems 11a and 11b seen in FIG. 1 and FIG. 2 also include a corresponding access point module 36, such as comprising wireless access point chambers 38, e.g., 38a, 38b, and associated routing for a 4×4 DUT Tester, in which the wireless access points (AP) 42, e.g., 42a, 42b, are located, for sending and receiving signals with one or more DUTs 20. FIG. 8 is a schematic diagram 200 of illustrative wireless access point test chambers 40, e.g., 40a, 40b, which can be implemented for a 4×4 DUT Tester 11.

Figure 9:
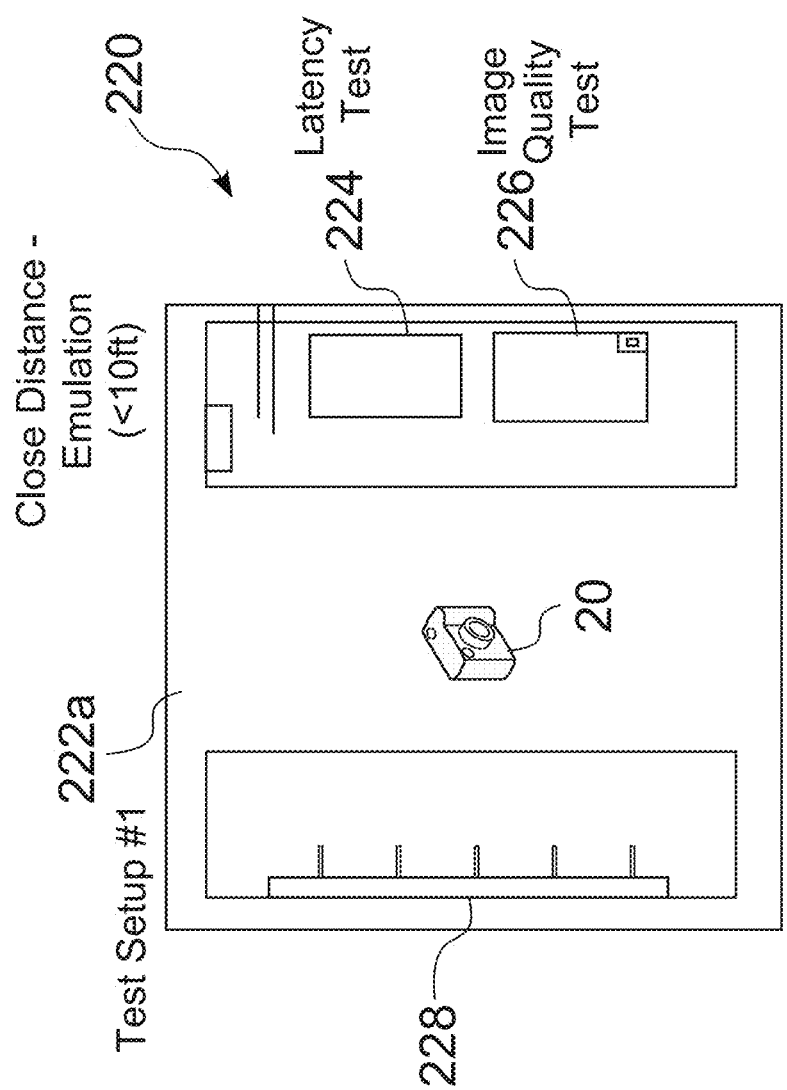
FIG. 9 is a block diagram showing an illustrative test setup for wireless video quality testing and delay/latency testing at close distances.
Figure 10:
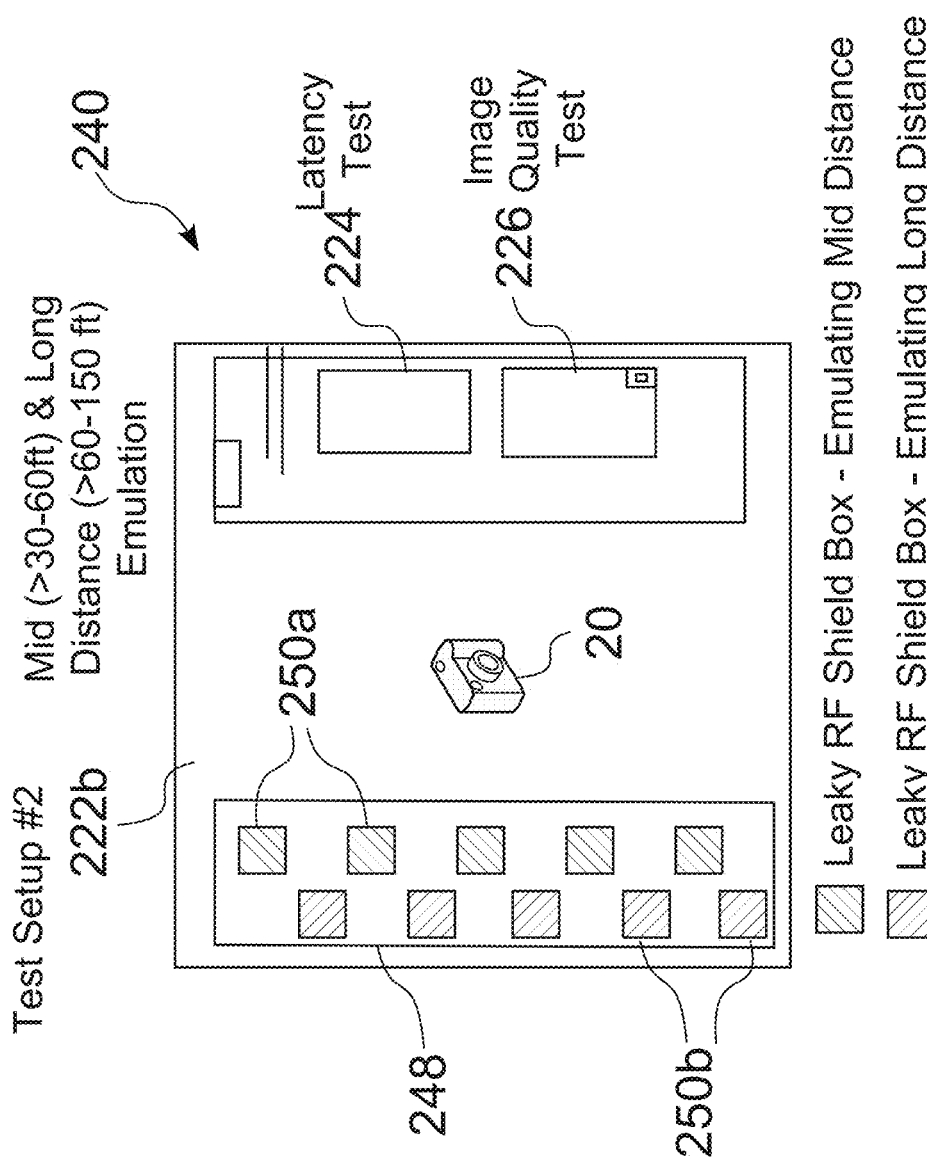
FIG. 10 is a block diagram showing an illustrative test setup for wireless video quality testing and delay/latency testing at midrange and long distances.

FIG. 9 is a block diagram 220 showing an illustrative test setup 222a for wireless video quality testing 226 and delay/latency testing 224 at close distances, e.g., such as for distances of less than 3 feet between a wireless camera 20 and a remote transceiver 228, e.g., an access point 42, 730. FIG. 10 is a block diagram 240 showing illustrative wireless video quality testing 226 and delay/latency testing 224 at midrange (e.g., approximately 30-60 feet) and long distances (e.g., approximately 60-150 feet) between a wireless camera 20 and an array 248 of one or more remote transceivers 228, e.g., an access point 42, 730. In the illustrative wireless video quality testing configuration 222b seen in FIG. 10, leaky RF shield boxes 250a can be used to emulate midrange distances between one or more wireless cameras 20 and an access point, while leaky RF shield boxes 250b can be used to emulate long distances between one or more wireless cameras 20 and an access point.

The illustrative test setups 222a and 222b seen in FIG. 9 and FIG. 10 can be used to test a multi-camera system, which in some embodiments can emulate a real home use case where there are multiple cameras 20 at different locations.

As such, the illustrative test setups 222a and 222b seen in FIG. 9 and FIG. 10 can be used to optimize parameters when multiple cameras 20 are used in a networked system. For instance, buffer management on the wireless cameras 20, as well as the base station 730, e.g., an access point 42, can be tested with the illustrative test setups 222a and 222b seen in FIG. 9 and FIG. 10. As well, the illustrative test setups 222a and 222b can be used to test wireless Enhanced Distributed Channel Access (EDCA) parameters of the wireless cameras 20. As well, in some embodiments, airtime fairness of an access point 42 can be optimized in the test setups 222a and 222b.

Furthermore, multiple network speeds, e.g., wide area network (WAN) speeds can be tested using the illustrative test setups 222a and 222b seen in FIG. 9 and FIG. 10, such as to make sure the system can operate from low speed Internet to gigabit fiber connections, and that the user is able to obtain optimized video quality for different WAN speeds, for one or more wireless cameras 20.

The illustrative test setups 222a and 222b seen in FIG. 9 and FIG. 10 can also be used to test local storage 862 (FIG. 21), such as for captured video data 806 (FIG. 21), e.g., where some of the videos are stored locally for local usage, and/or are stored locally and sent out to cloud 514 (FIG. 21) later on.

Figure 19:
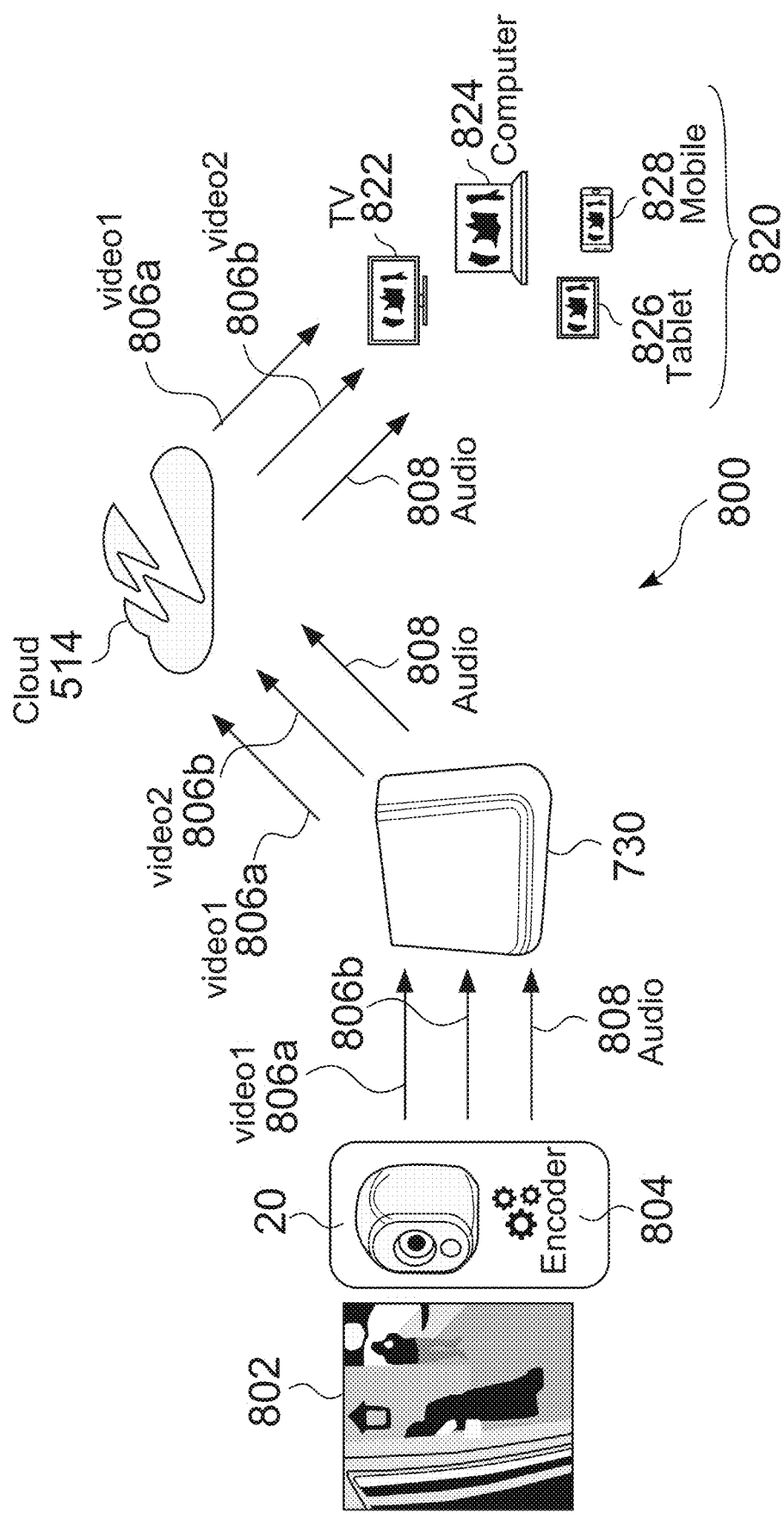
FIG. 19 is a block diagram showing illustrative wireless camera streaming through a cloud environment.

The illustrative test setups 222a and 222b seen in FIG. 9 and FIG. 10 can also be used to test peer to peer connectivity (FIG. 20), such as where a base station 730 sends video directly to a user device 820 (FIG. 20), e.g., to a TV 822 (FIG. 20), a computer 824 (FIG. 20), a tablet 826 (FIG. 20), or a mobile device 828 (FIG. 20), without going through the cloud 514 (FIG. 19).

Figure 11:
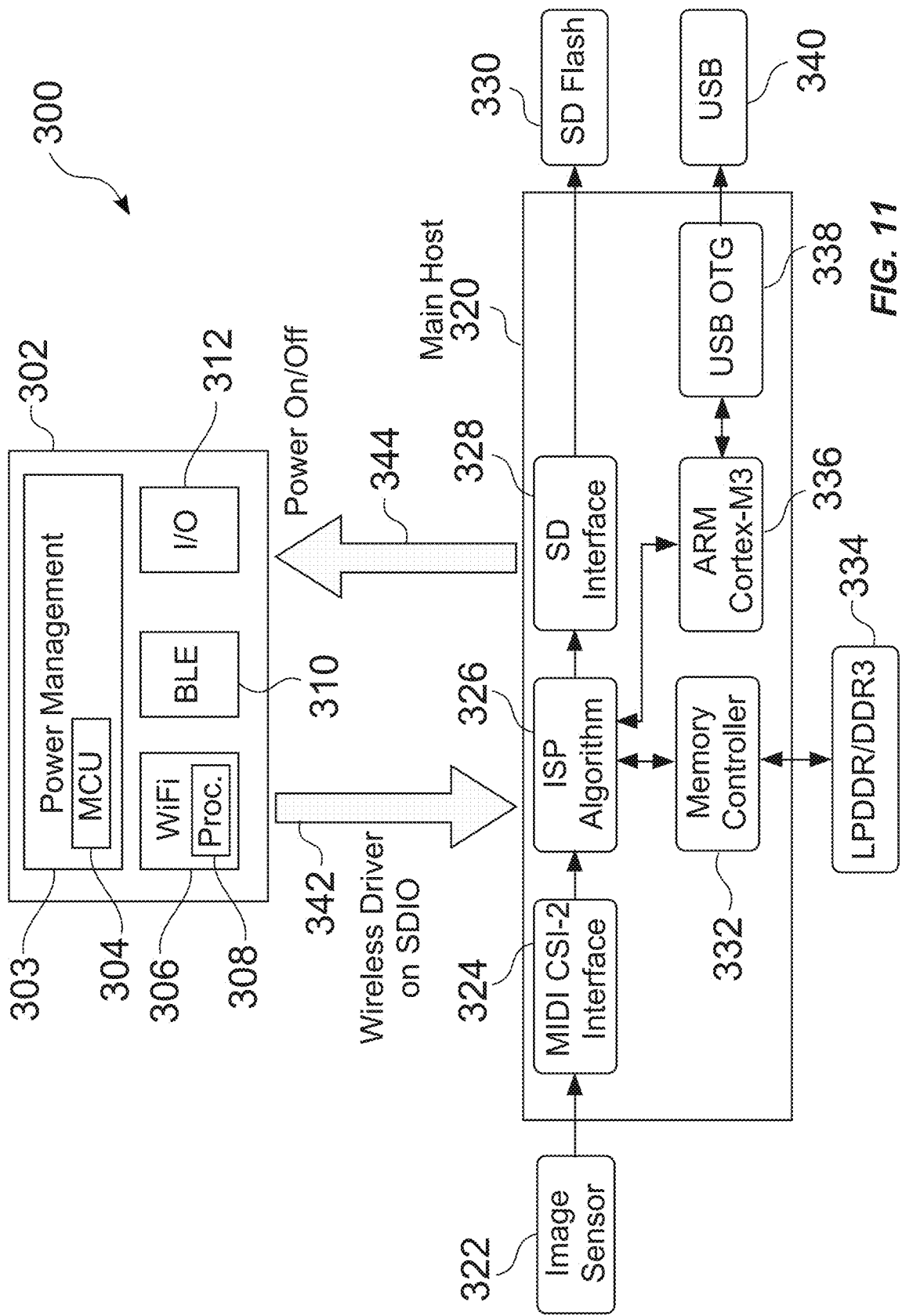
FIG. 11 is a block diagram of an illustrative wireless camera.

FIG. 11 is a block diagram 300 of an illustrative wireless camera 20, such as for connection with a main host 320. In some embodiments, the wireless camera 20 is compatible with any of and Arlo™ or an Orbi™ wireless system, such as available through NetGear, Inc., of San Jose, Calif.

The illustrative wireless camera 20 seen in FIG. 11 comprises a central module 302, that includes power management having a microcontroller (MCU) 304, a Wi-Fi chip 306 having an associated processor 308, a BLE 310, and I/O 312. An illustrative main host 320 includes an image sensor 322, a sensor interface 324, e.g., a MIDI CSI-2 interface 324, an internet service provider (ISP) algorithm 326, and an SD interface 328, which can send information to an SD flash 330. The illustrative host 320 also includes a memory controller 332, which can communicate with a memory 334, e.g., an LPDDR/DDR3 334. The illustrative host 320 also includes an ARM Cortex-M3 336 connected to the image processing (ISP) Algorithm 326, in which the ARM Cortex-M3 336 is connected to a USB On-The-Go (OTG) 338, which can output to a USB 340.

The illustrative wireless camera 20 seen in FIG. 11 is configured to communicate with a base station 730, e.g., an Arlo base station 730 (FIG. 17), available through Netgear, Inc., of San Jose, Calif. In some embodiments, the base station 730 is configured to communicate over a cloud-based architecture 514 (FIG. 19). For instance, some embodiments can communicate over the Amazon Cloud 514, such as using licensed software, e.g., Video Streaming Server Software, using a media streaming server, e.g., a Wowza Streaming Engine. In an illustrative embodiment, image and/or video media is sent to the media streaming server, and the media can then be streamed right to one or more wireless devices 820, e.g., a TV 822, a computer 824, a tablet 826, or a mobile device 828.

In some embodiments, e.g., for battery operation, the illustrative wireless camera 20 seen in FIG. 11 is almost always powered off, except for the microcontroller 304 and part of Wi-Fi 306.

During initial connection of the wireless camera 20, because the way the wireless camera 20 is structured, the Wi-Fi chip 306 has a processor 308, which runs most of the Wi-Fi operation, while a driver on a main host 320 is configured to talk 344 to the Wi-Fi chip 306, such as to keep the state and things like that over a bus, e.g., similar to a PCIe bus on an access point 42, e.g., 42a,42b, or to a PCI bus on a laptop computer. Some embodiments of the wireless cameras use 342 a Secure Digital Input Output (SDIO) bus, such as used in some cell phones.

In operation, because the main host 320 is almost always shut off, the wireless camera 20 can often lose state, As such, upon startup to an active state, i.e., during a power on, some embodiments of the wireless cameras 20 are required to redo everything from scratch.

In some embodiments, this problem can be addressed, using an architecture in which the wireless camera 20 connects for the first time, such as for initialization and synchronization of a new wireless camera 20, e.g., as part of a new wireless camera system, or for a wireless camera to be added to an existing wireless camera system. During initial synchronization to a base station 730, a new wireless camera 20 can experience difficulty in some interference environments, such as in which the camera is not able to connect.

In a conventional PC architecture, wherein the main host is always on, a device can repeatedly request to connect over a Wi-Fi network, and then can go to power. In contrast to such systems, a wireless camera 20 is often required to transfer between states, and then sometimes during initial connection such a system can fail. Such a failure can occur during Wi-Fi scanning, e.g., when the wireless camera 20 scans an access point (AP) 730.

In some environments, the wireless camera 20 may not detect the access point 730 the first time, which requires that the wireless camera 20 keep scanning until the access point 730 is seen, i.e., detected.

For devices that run on a Windows, Mac OS, or Android system architecture, when attempting to connect to an access point (AP) over a Wi-Fi network, such devices typically continue to scan, until the user presses the access point (AP). For systems that include a large number of APs, it can take a long time for to connect to a specific AP.

Standard wireless devices, such as phones and PCs, may transmit a probe from every Wi-Fi channel, to determine other devices that occupy each of the channels. This procedure may occur a number of times, e.g., three or four times, at which time the wireless device may then wait for a predetermined period of time, before repeating the same probing procedure.

In contrast to such conventional powered devices, for a wireless device 20 having limited power storage, e.g., a battery, it can be beneficial to address connectivity issues between a wireless device 20 and an access point (AP) or base station 730, while conserving the available stored power.

For an illustrative embodiment of a wireless device or camera 20 as disclosed herein, it typically connects onto to its own base station 730, for which a service set identifier (SSID) doesn't change. As the channel rarely changes, the wireless device or camera 20 does not have to change the scan parameters to look for a certain SSID, and as such is not required to send a large number of probes. For instance, if the last channel used is known, e.g., channel 1, channel 6, or channel 8, the wireless device or camera 20 does not have to probe every channel. With conventional wireless cameras, every time they connect, they probe every channel.

In contrast, some embodiments of the wireless devices 20 disclosed herein send more probes on where the access point 730 is probably located. For instance, a conventional wireless camera may send four probes on each of 11 channels, (resulting in 44 probes). In contrast, for a current embodiment in which a camera base station 730 is usually accessible on a two of eleven channels, the wireless camera can be configured to send six probes on each of the two probable channels, and then spend less time and less power and actually find it.

In some embodiments, the wireless devices or cameras 20 can actually scan, such as to see if the access point 730 is beaconed which, in some cases can save power. In terms of the power context, while the use of predictive scanning consumes less power, when it is active and sending transmits; then it burns more power. Therefore, because such an embodiment can reduce the active time and/or use a predictive technique to do the active transmits, it can be used to conserve power. In some embodiments, instead of sending out probes, which uses power, the wireless devices or cameras 20 can operate in a listen or receiving mode, and some such embodiments, the wireless devices or cameras 20 only listen on certain channels that are known to exist.

As noted above, some embodiments of the wireless devices or cameras 20 can actively send probes, such as on one or more selected channels. In some embodiments, when there is no need to probe, the wireless devices or cameras 20 can either operate in a receive mode (such as because it is known that the base station 730 was there five minutes ago), or if something happened (e.g., upon a disconnection).

For embodiments of the wireless devices or cameras 20 that use a listening connection protocol, i.e., a receive mode, the listening can be performed at a low data rate of the radio, in contrast to active probing, which can require a longer active time. As the time used for activation requires power, some embodiments of the wireless devices or cameras 20 are configured to optimize whichever mode is used.

In some current embodiments, the wireless cameras 20, as well as other Wi-Fi devices in the system, are enabled to perform the scanning on selected channels. If the scanning devices see the access point 730, they try to connect to it. If the scanning doesn't work, e.g., such as if a phone 504,828 scans and sees a corresponding base station 510, but cannot connect, the phone 504,828 may continue to try to connect for a small period of time, and then give up if unsuccessful.

Similarly, in such embodiments, if a wireless camera 20 is unsuccessful in connecting to the base station 510, the wireless camera 20 gives up and powers off, i.e., it sleeps and shuts down. When the wireless camera 20 comes out of its sleep mode, it does a scan and then tries to connect. If the wireless camera 20 sees that the access point or base station 730, 510 is there, and the signal strength is within some criteria, the wireless camera 20 can be more persistent to connect to that access point or base station 730,510.

In some embodiments, instead of trying to connect multiple times and giving up, the wireless camera 20 can attempt to connect over a certain duration of time, and in some embodiments can modify these parameters. For instance, a wireless camera 20 that proceeds with ten attempts within a very short time, sleeps for five minutes, an then proceeds with ten attempts again, may not work well. As such, some embodiments of the wireless devices or cameras 20 are configured to modify one or more parameters, e.g., the number of attempts, duration, etc., to increase the probability of connection, i.e., to reduce the delay in connection, while conserving power.

In some wireless system embodiments, a tutorial event packet is provided for transition management, in which wireless clients, e.g., 20, and recipient devices 820 go between access points or base stations 730, 510 or between bands. In some embodiments, similar procedures can be used as a recovery mechanism. For instance, if a wireless device or camera 20 is not responding, the wireless device or camera 20 can be instructed to switch bands, such as to triggers the wireless device or camera 20 to take some action. In some embodiments, if such a procedure does not work, instead of bringing down the whole access point 730,510, the system can blacklist that client wireless device or camera 20 for some certain duration, such that the client wireless device or camera 20 cannot communicate to the access point or base station 730,510, which in some embodiments may cause the client wireless device or camera 20 to do a recovery.

In some embodiments, the wireless system, e.g., 500 (FIG. 13) can reset the whole Wi-Fi network 506 (FIG. 13) and/or wireless devices or cameras 20, such as by stopping the transmission of beacons for a period of time, e.g., five seconds. Upon resetting the whole state, every wireless client device or camera 20 has to reconnect with the access point 730, 510. In such a scenario, to perform a system reset, the access point 730 can be instructed, e.g., "Don't send beacons for five seconds", which will trigger the corresponding wireless devices or cameras 20 to start resetting.

In some embodiments, if the above reset procedure does not work, a restart of the access point 730 itself can initiate the restart of the corresponding wireless client devices or cameras 20. However, for a system that includes several wireless devices or cameras 20, if one of the wireless devices or cameras 20 is not functioning, and the access point 730 is reset, all of the corresponding wireless devices or cameras 20 would be required to reset, which can waste energy and slows things down.

As such, in some embodiments, one or more procedures can be used in conjunction with a problematic wireless device or camera 20, to persuade it to connect, such as by probing the wireless device or camera 20, or by sending a protocol, e.g., a 11v BTM packet, that's used for a client device or camera 20. For instance, such a protocol can be used to direct a wireless device or camera 20 to connect to a preferred access point 730 of a plurality of possible access points 730.

Some embodiments of the wireless system can include an on-board Wi-Fi protected setup (WPS), such as initiated by a user through the use of a button. While WPS has been used in prior systems as a single step reset, some embodiments of the wireless systems disclosed herein are configured to integrate advanced recovery functions, e.g., intelligent, predictive, and/or adaptive functionality. For instance, in some embodiments, the system can implement WPS, such as at both the access point 730 and the wireless client devices or cameras 20, to use what happened the last time, and then for the next time either continue from where it failed, or retry more if it has gone through some of the steps. For integrated system embodiments that include the access point 730 and wireless camera(s) 20 together, the WPS can apply to the matched set, i.e., so that they are known to each other, so as to allow the WPS go through multiple retries, without compromising application layer security.

Wi-Fi Rate Control.

In conventional systems, every time the system goes to sleep, the driver of Wi-Fi on the main system on a chip (SoC), which keeps most of the state, loses state. So, every time such a system goes to sleep, the next time it wakes up, the operating system boots up on the main SoC.

In some system embodiments, retraining occurs every time a motion trigger happens in the house, wherein the system starts from scratch. In some embodiments, the state is saved to flash memory, such that when the DDR memory 334 is turned off and everything is turned off, upon a subsequent startup, the system has access to the stored information, e.g., what worked before, and then continue from there.

Some embodiments of the wireless systems use a generic rate control that is designed for maximal throughput, such as shown in FIG. 16, which extends from highest rate to lowest rate. In some embodiments, when the wireless device or camera 20 comes out of a power save mode, the wireless device or camera 20 starts from somewhere in the middle of rate modes, and it tries to learn where to go. For instance, the wireless device or camera 20 may attempt to operate in a 64 quadrature amplitude modulation (QAM) mode, but is unsuccessful after a number of times, e.g., five times. In another scenario, the wireless device or camera 20 may start from a microcomputer set 8 state (MCS8), e.g., the highest rate shown in FIG. 16, and fail. Under such a scenario, the wireless device or camera 20 can be configured to fall back one or more rates, as necessary, to arrive at a rate by which the video or audio packets 806,808 can successfully be sent.

Figure 12:
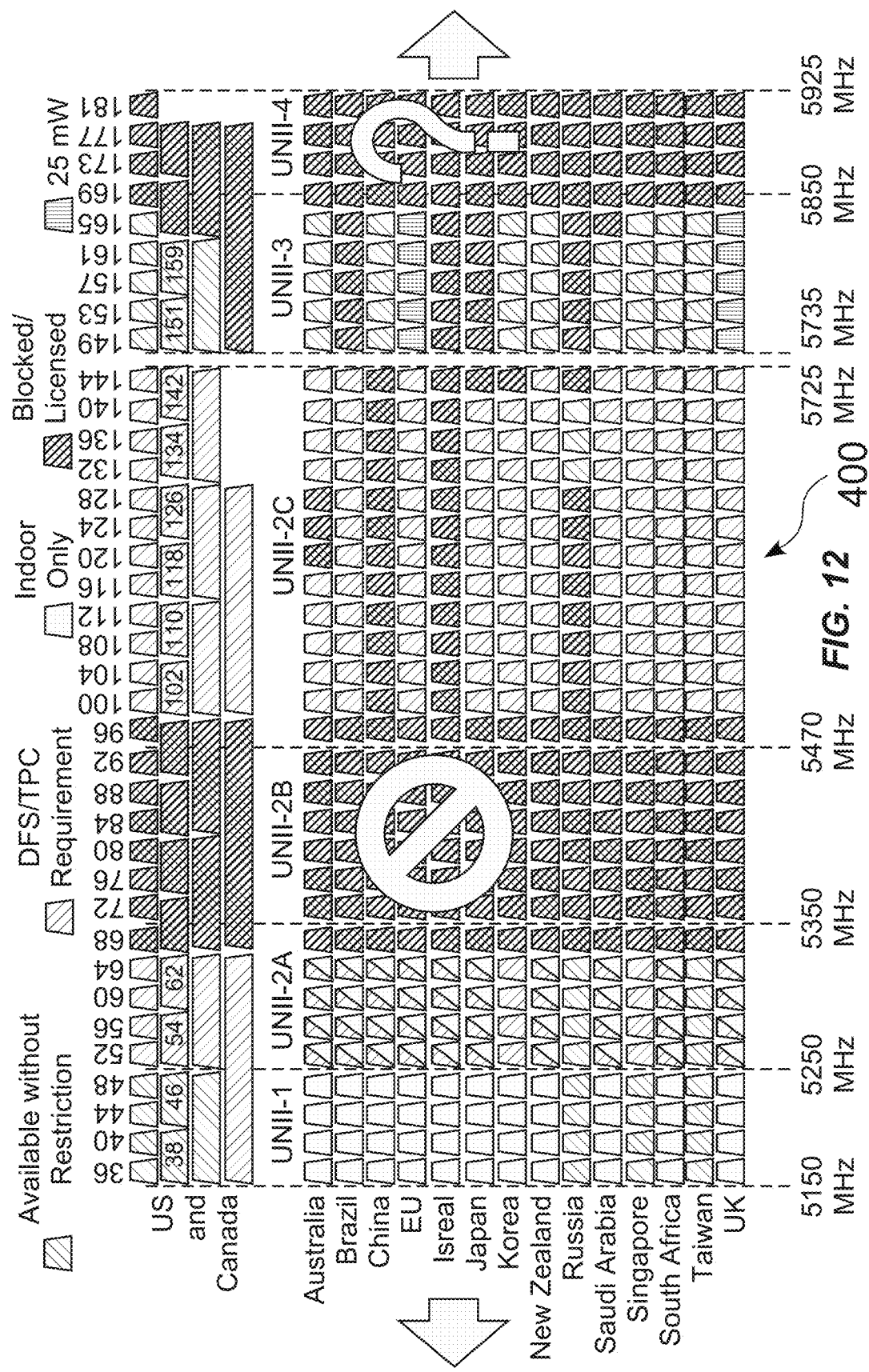
FIG. 12 is a diagram showing illustrative channel allocation in a 5 GHz frequency band, such as for a wireless base station, e.g., an Arlo base station.
Figure 17:
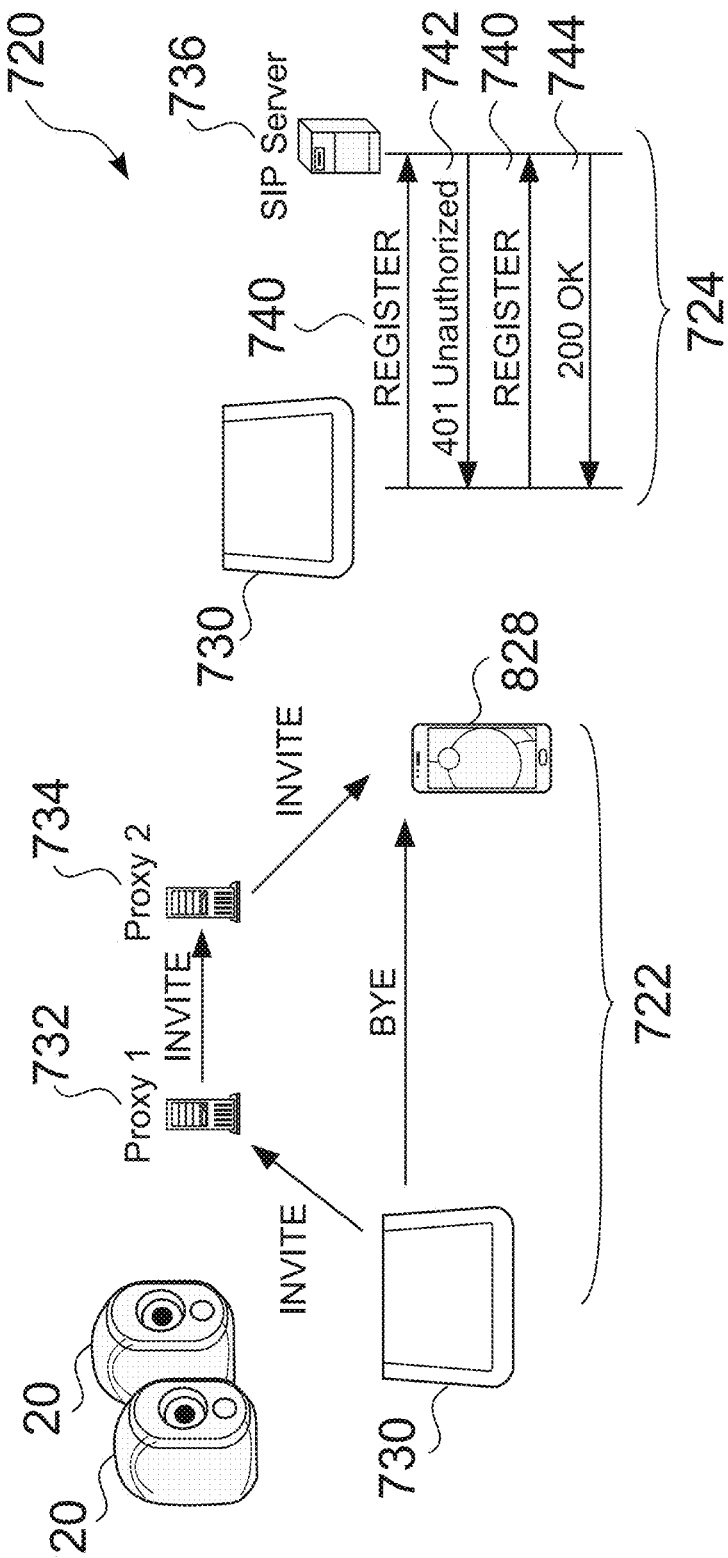
FIG. 17 is a block diagram showing a SIP call with a wireless camera.

FIG. 12 is a diagram showing illustrative channel allocation 400 in a 5 GHz frequency band, such as for an Arlo base station 730 (FIG. 17). Depending on implementation specifics of a network-connected camera system selection of a channel in the 5 GHz frequency band may be generally preferable over a channel in the 2.4 GHz frequency band. FIG. 12 shows a diagram of channel allocation in the 5 GHz frequency band in various countries. The 5 GHz band includes many more allowable channels than are included in the 2.4 GHz band including channels at varying bandwidths (e.g., ranging from 20 MHz to 160 MHz available for Wi-Fi). Further, the 2.4 GHz frequency band has a greater effective range than the 5 GHz frequency band which is beneficial in some cases, but also leads to more interference from distance signal emitters. Also, particularly in a home network environment, the 2.4 GHz frequency band may experience more interface due to use by many other household devices such as cordless phones, Bluetooth devices, Zigbee devices, microwave ovens, etc.

As shown in FIG. 12, regulations in the United States and other countries allow access to Wi-Fi without restriction in certain portions of the 5 GHz band (e.g., ~5150-5250 MHz and 5735-5835 MHz), restrict access to Wi-Fi completely in certain portions of the 5 GHz band (e.g., ~5350-5470 MHz and 5835-5925 MHz), and allow Wi-Fi with dynamic frequency selection (DFS) in other portions of the 5 GHz band (e.g., ~5250-5330 MHz and 5490-5730 MHz). Dynamic frequency selection describes a mechanism by which unlicensed devices are allowed to use portions of the 5 GHz frequency band that are generally allocated for use by radar systems without interfering with the operation of the radar systems. Generally, operation on a DFS channel requires that a device monitor for the presence of radar transmissions on the channel and vacate the channel in response to detecting such transmission.

In some embodiments, selecting DFS channels in the 5 GHz band may be preferable as long as the networking devices (e.g., wireless AP 120) are configured for DFS. This preference is due to the fact that fewer home devices utilize DFS channels so they are generally less prone to interference. However, as indicated above, use of a DFS channel will require that a new channel be selected when the presence of radar is detected.

Figure 13:
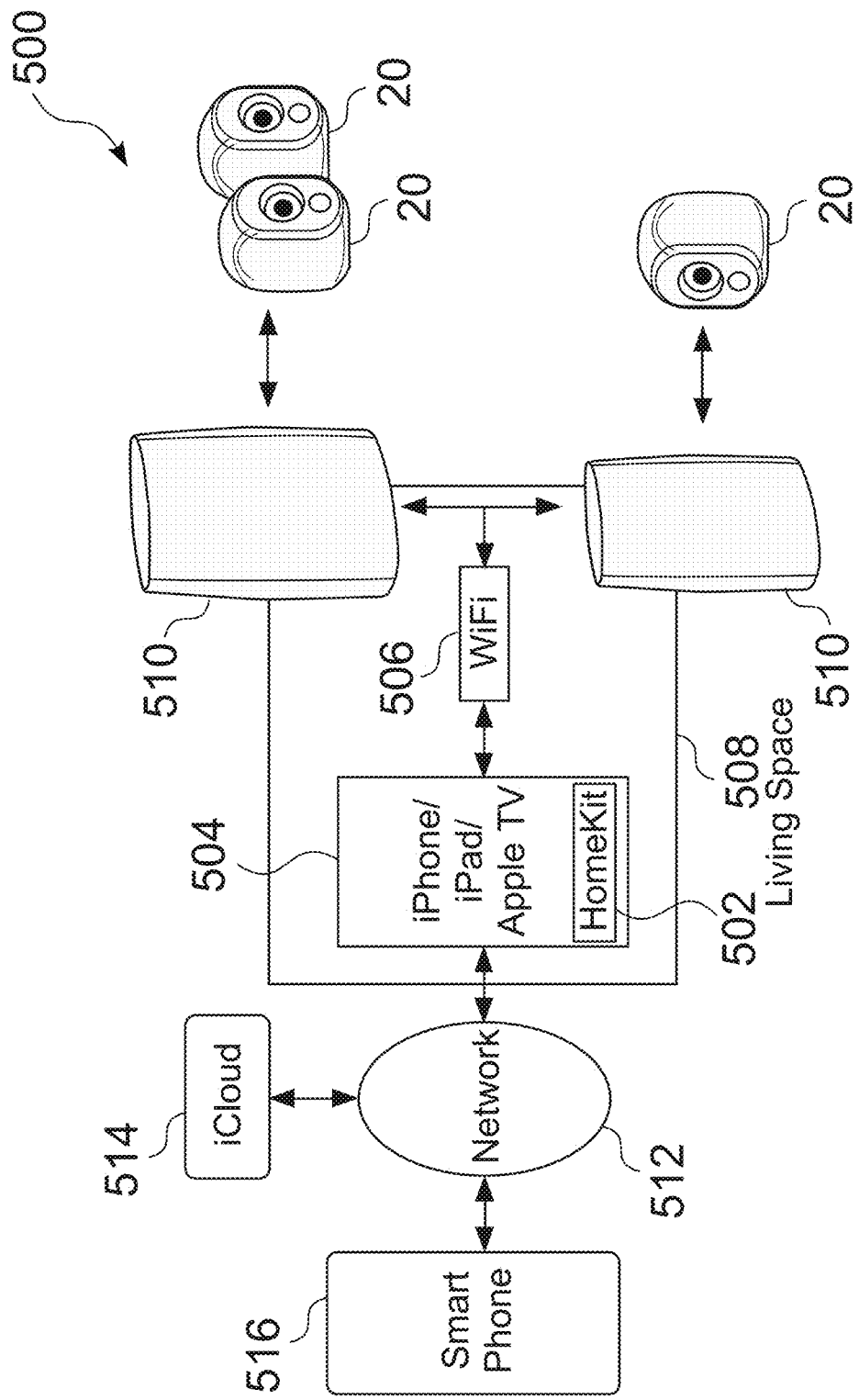
FIG. 13 is an architectural diagram showing an illustrative integrated system, e.g., a HomeKit system, that includes one or more wireless cameras.

FIG. 13 is an architectural diagram of an illustrative integrated system 500, e.g., a HomeKit system 500, for use with one or more wireless devices or cameras 20. The illustrative system 500 seen in FIG. 13 includes one or more wireless cameras 20, such as for surveillance on a property or living space 508, in which the wireless cameras 20 can connect through one or more access points 510 and a Wi-Fi network 506, such as to send camera images 802 and/or video 806, e.g., 806a,806b (FIG. 19) to an enabled device 820, e.g., an iPhone 828, an iPad 826, or an Apple TV 822 having corresponding software 502. The illustrative wireless device 504 seen in FIG. 13 can also send and receive signals through a network 512, such as to communicate with a smart phone 516 or over a cloud 514 to other devices. In this manner, image data 806, audio data 808, or other information can be captured through the enabled device 504, and can also be sent to other recipients.

Figure 14:
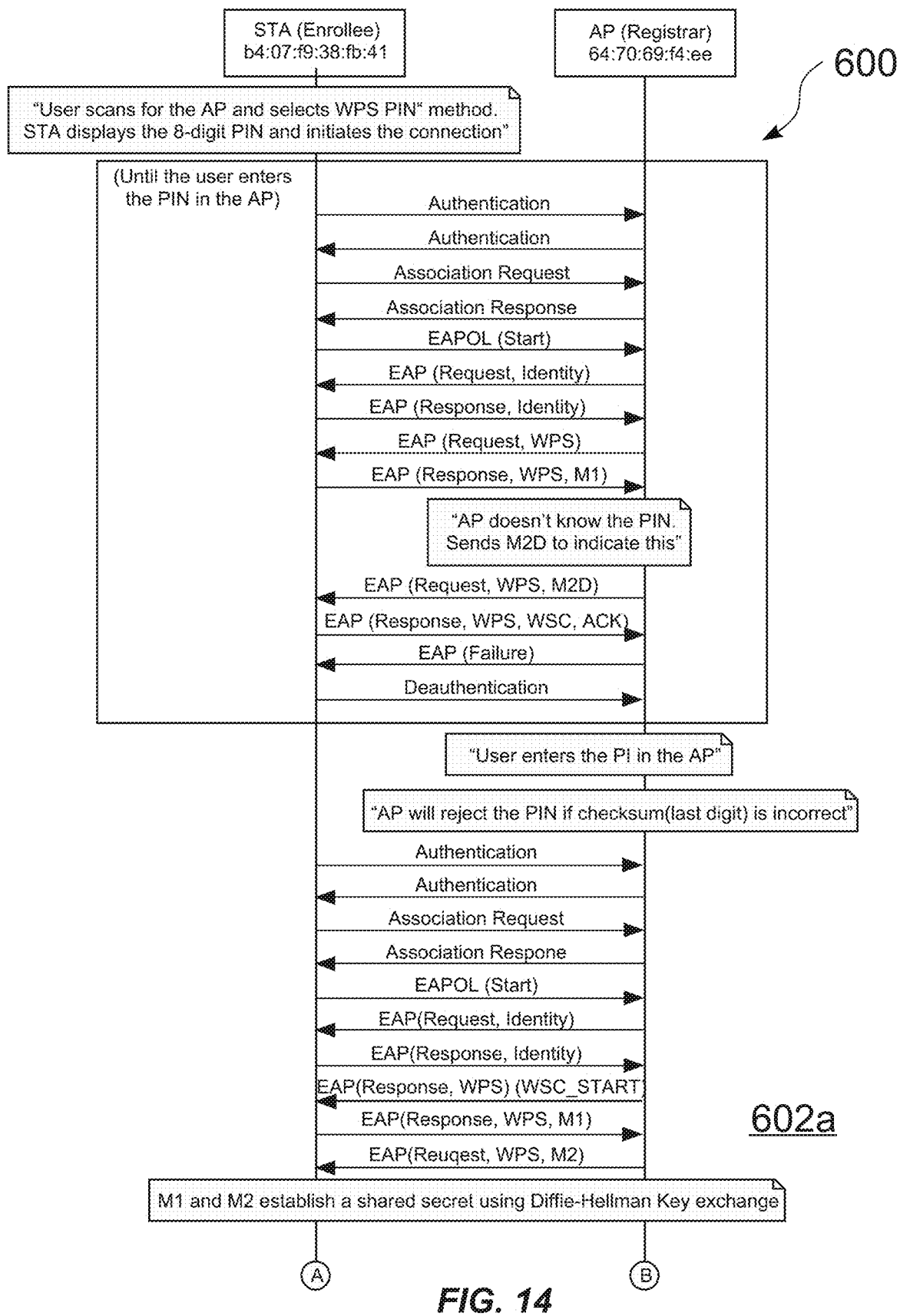
FIG. 14 is a flow diagram showing a first portion of station enrollment with a wireless access point.
Figure 15:
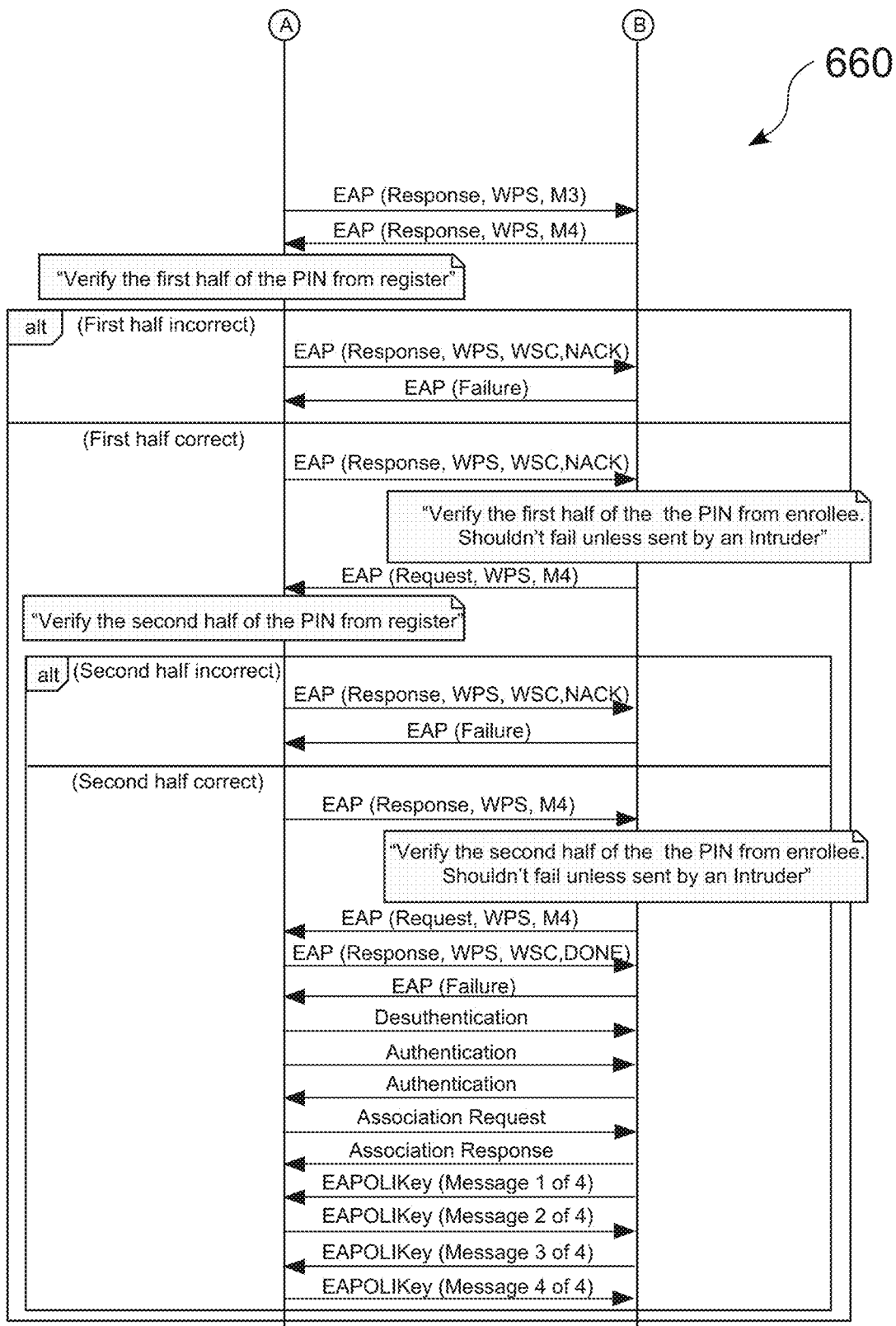
FIG. 15 is a flow diagram showing a second portion of station enrollment with a wireless access point.

FIG. 14 is a flow diagram showing a first portion 600 of station enrollment 602a with a wireless access point 730. FIG. 15 is a flow diagram showing a second portion 660 of station enrollment 602b with a wireless access point 730. As noted above, for a system including one or more wireless devices or cameras 20 having limited power storage, it is beneficial to test and optimize procedures to be carried out by the wireless devices or cameras 20.

FIG. 16 is a chart 700 showing illustrative rate control parameters for operation and testing of a system that includes one or more wireless devices or cameras 20.

System Architectures for Wireless Devices and Cameras.

The systems and methods disclosed herein for testing and optimization of wireless devices and cameras 20 can be implemented for a wide variety of wireless architectures and procedures.

Figure 18:
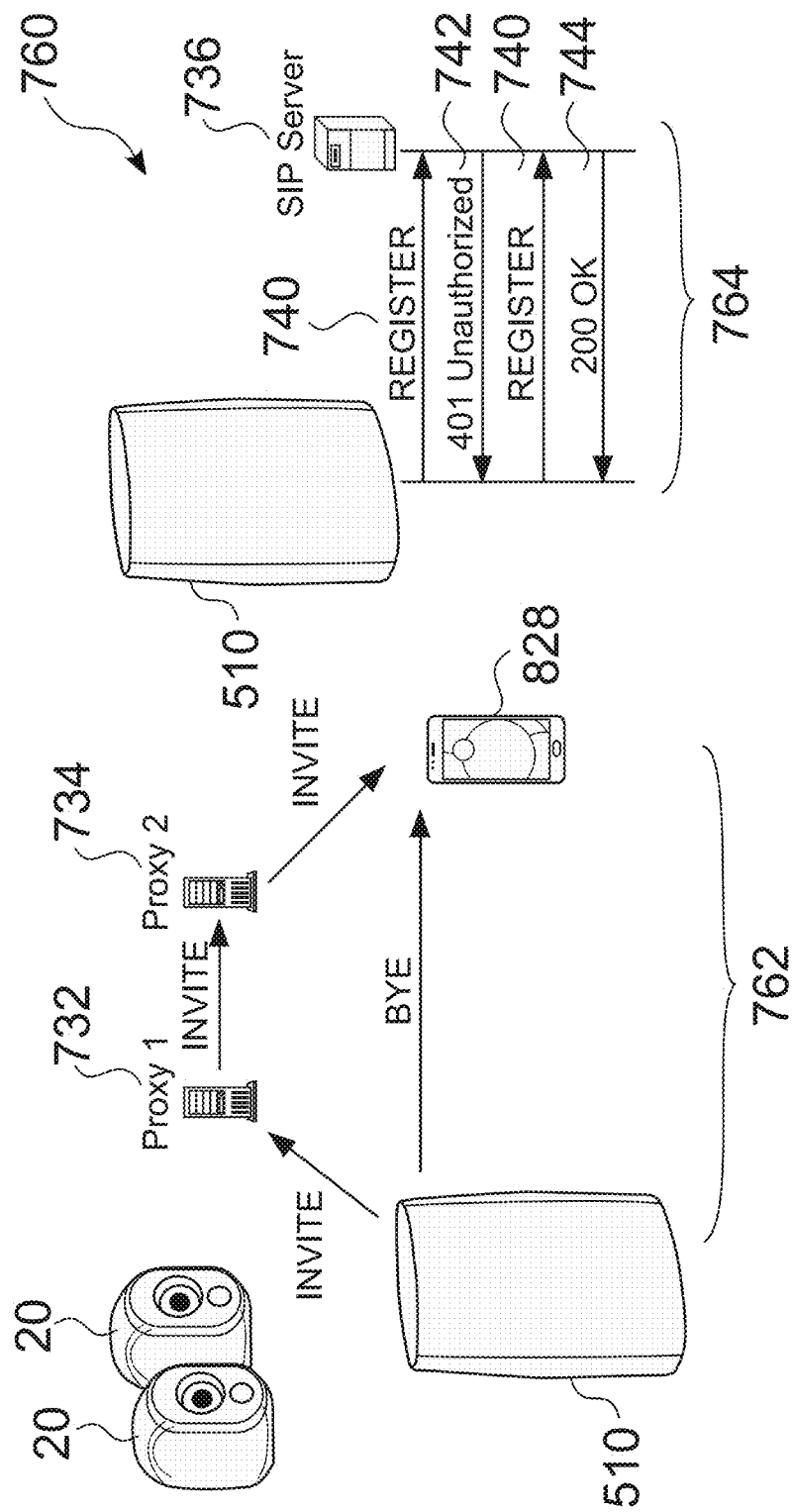
FIG. 18 is a block diagram showing a SIP call in a mesh network.

For instance, FIG. 17 is a block diagram 720 showing an illustrative Session Initiation Protocol (SIP) call with a wireless camera 20, such as including a call setup protocol that operates at the application layer over the wireless system. In the illustrative architecture seen in FIG. 17, a local network can be established between wireless devices 20, e.g., wireless cameras 20 and an access point 730, e.g., an Arlo access point 730. FIG. 18 is an illustrative block diagram showing a SIP call in a mesh network 760. In the illustrative architecture seen in FIG. 18, a local network can be established between wireless devices 20, e.g., wireless cameras 20, and a wireless access point, base station or router 510, e.g., an Orbi 510.

As seen in FIG. 17 and FIG. 18, a wireless access point, base station or router 730 or 510 can send SIP information to a local or remote wireless device 820 (FIG. 19), e.g., a smart phone 828 (FIG. 19), such as directly, and/or through one or more proxy devices, e.g., proxy 1 732 and proxy 2 734, as schematically shown in 722, 762. In an illustrative interchange 724,764 a wireless access point, base station or router 730 or 510 can send a register request to a SIP server 736, by which the SIP server 736 can either deny the request, e.g., returning an "401 Unauthorized" response 742, or can authorize or otherwise permit the request, e.g., returning a "200 OK" response 744.

Such architectures can be implemented to send information, e.g., real-time video 806, e.g., 808a, 806b (FIG. 19), to a user of the wireless device 820, such as for remote monitoring of a surveillance system. In an illustrative scenario, instead of going through an application, the system can be configured to establish a call to the smart phone 828, such as to notify the user that somebody has broken into their home 508 (FIG. 13), and in some embodiments can then provide information, e.g., stored and/or live images 802, video 806, and/or audio 808. While some wireless devices or cameras 20 can be enabled to call a smart phone 828, in some embodiments, as seen in FIG. 17 and FIG. 18, the wireless access point, base station or router 730, 510 is enabled to provide such functionality, such as by loading one or more protocols, e.g., Apple-based protocols, Android-based protocols, or plain session initiation protocol (SIP) based protocols. For instance, in some embodiments, the wireless access point, base station or router 730, 510 is enabled, with an Apple iOS based protocol, to call Apple devices 504,516, and/or is enabled with Google protocol, to call Google devices 504,516. As well, in some embodiments, the wireless access point, base station or router 730, 510 is enabled with standard or default protocol, such as to connect to any wireless device 820, or to a smart phone having an unknown protocol.

An illustrative embodiment of a wireless networked system, such as seen in FIGS. 13, 17 and/or 18, can readily determine which mobile devices 820 to call from the wireless access point, base station or router 510, 730, and whether to call one or more mobile devices 820. As well, an illustrative embodiment of a wireless networked system can determine what video resolution and/or what bit rate to use for remote transmission to one or more mobile devices 820, and what failover modes to use, such as if transmission to a first, i.e., primary or preferred, mobile device 820 does not work, what secondary or backup mobile device 820 or secondary user should be contacted from the access point, base station or router 510, 730, and what default conditions, e.g., bit rate and image resolution, are to be used for transmission to the secondary or backup mobile device 820.
Streaming System Architectures and Operation.

Figure 20:
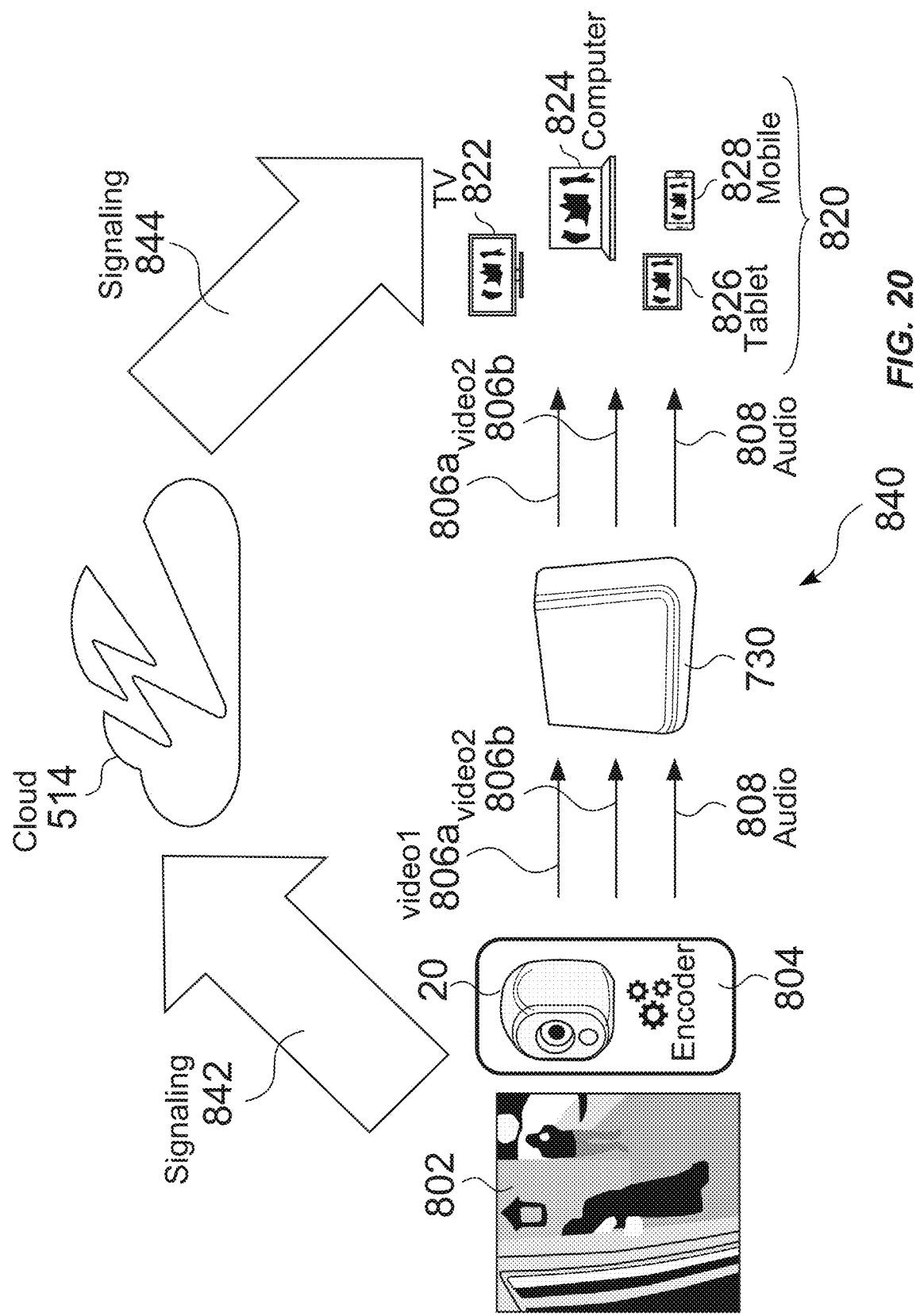
FIG. 20 is a block diagram showing peer-to-peer wireless camera streaming.
Figure 21:
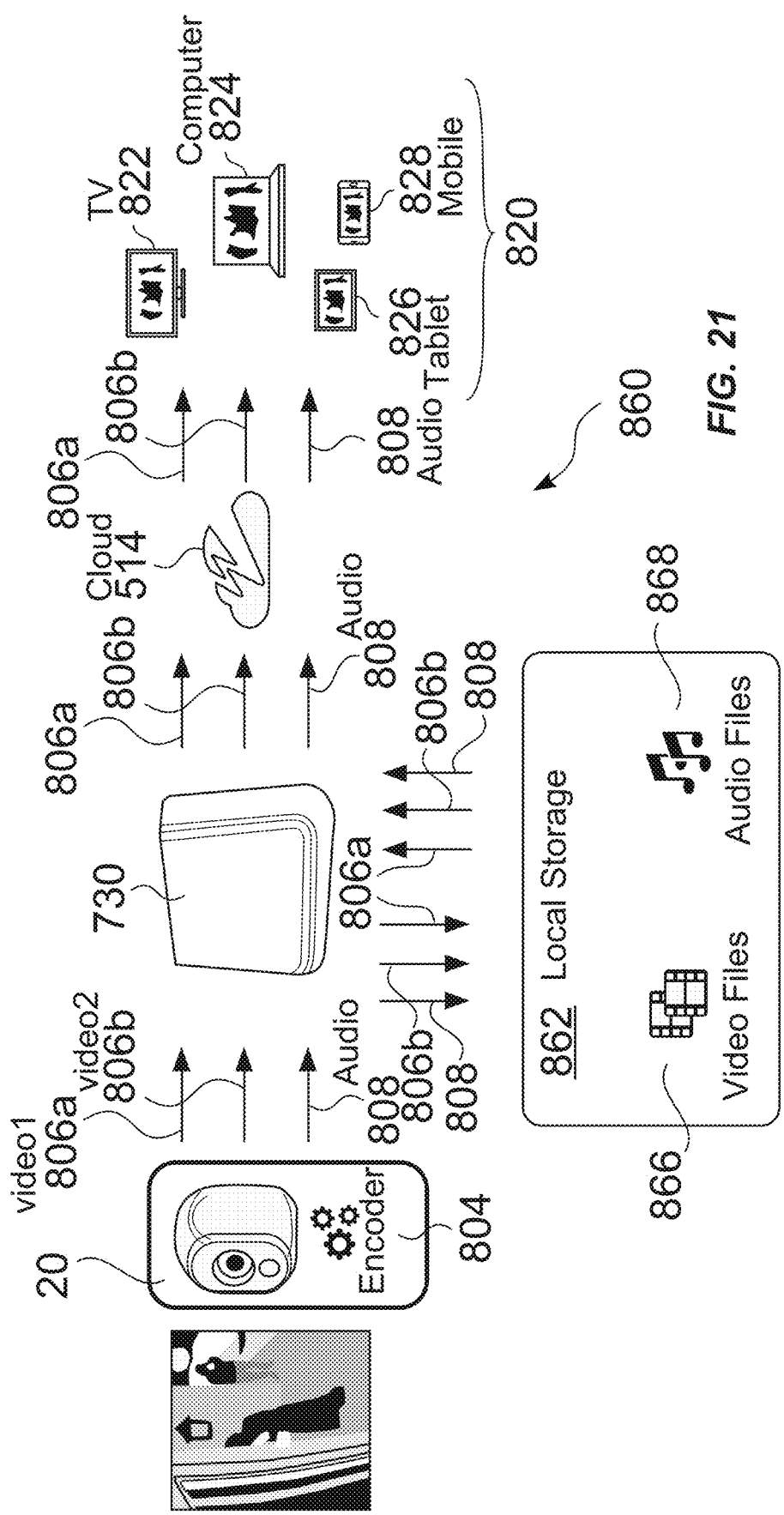
FIG. 21 shows illustrative wireless camera streaming through a cloud environment with local storage.

FIG. 19 is a block diagram 800 showing illustrative wireless camera streaming through a cloud environment. FIG. 20 is a block diagram 840 showing peer-to-peer wireless camera streaming. FIG. 21 is a block diagram 860 that shows illustrative wireless camera streaming through a cloud environment with local storage 862.

In the illustrative embodiments seen in FIGS. 19, 20, and 21, the wireless camera 20 includes an encoder 804, such that images 802, video 806, e.g., 806a,806b and/or audio 808, and or other data, e.g., smoke detection, carbon monoxide, entry detection, and/or other data captured by the wireless camera 20 or other sensors can be encoded before being transmitted, e.g., 806a,806b,808 toward the access point 730.

In the illustrative system seen in FIG. 19, the encoded video 808a and 806b and audio 808 are sent through the access point 730, and are then transmitted, such as through a Cloud system 514, to be delivered to one or more remote devices 820.

In the illustrative system seen in FIG. 20, the encoded video 808a and 806b and audio 808 are sent through the access point 730, and are then transmitted directly to one or more remote devices 820, such as to provide peer-to-peer wireless camera streaming, while the wireless device or camera 20 can provide signaling 842, 844, such as through a Cloud system 514, to be delivered to the remote devices 820.

In the illustrative system seen in FIG. 21, the encoded video 808a and 806b and audio 808 are sent to the access point 730, and can be stored as data, e.g., video files 866 and audio files 868, in local storage 862. The access point 730 can forward the encoded video 808a and 806b and audio 808, and/or the stored data 866, 868, directly to one or more remote devices 820, such as to provide peer-to-peer wireless camera streaming, such as through a Cloud system 514

Some system embodiments only include a local video encoder 804, such as with the hardware of the wireless camera 20, wherein the encoded video 806 is not transcoded further during transmission.

Other system embodiments can provide remote encoding 804, and/or can provide subsequent transcoding, such as to provide formatting and resolution that depends upon the technical capabilities of the recipient device 820. For example, for a wireless camera 20 that is able to record very high-quality videos 806, an intended recipient device 820 may not be able to process and display the videos 806, at the higher quality and/or at an acceptable bit-rate. In such a scenario, the user of the intended recipient device 820 may not be able to see it through their viewing application, such as based on limitations of the intended recipient device 820, and/or if the intended recipient device 820 is currently located in a location with inadequate Wi-Fi coverage.

As such, some system embodiments can provide encoding 804, and/or transcoding, such as through the wireless access point, base station, or router 510,730 to provide video quality and bit-rate that depends on one or more intended recipient devices 820. For instance, the transcoded video 806 to be delivered to a cell phone 828, having a relatively small screen, would be different than transcoded video 806 to be delivered to a TV 822 having a large screen.

While general transcoding for the delivery of media has previously been utilized to deliver conventional media, e.g., movies and television broadcasts, in which the media content is stored and delivered in several different formats, transcoding has not previously been implemented for the transmission of video 806 and/or audio 808 from peripheral devices or cameras 20, through an access point, base station, or router 510,730. As such, some system embodiments can determine the characteristics of the intended recipient devices 820, the characteristic of the medium and/or the throughput, and then feed back the information to the transcoder, such as integral with the access point, base station, or router 510,730, or within the Cloud 514, and use this information to transcode the signals 806,808.

In operation, people typically watch videos when they are at home 508 (FIG. 13). In the same manner, media content and other video 806 and audio 808 can be delivered though the access point, base station, or router 510,730. In such a scenario, a cell phone having good wireless reception can stream data at a high rate, a TV located in a basement that is far from the access point, base station, or router 510,730 may not stream well, while a TV 822 located very close by the access point, base station, or router 510,730 can stream wireless signals at a higher data rate.

Some embodiments of the access point, base station, or router 510,730 include hardware acceleration, e.g., through a chip set, to provide local transcoding operations, while in some embodiments, the transcoding can be provided on the Cloud 514, such as through a licensed service, such as available through Wowza Media Systems, LLC, of Golden, Colo.

In some embodiments, the native format would be a high resolution format, which is sent through the access point, base station, or router 510,730 to the Cloud 514, at which point the high resolution format can be transcoded, either upon receipt, or on-demand, based on the recipient device 820. For instance, the system can collect information or statistics about a device 820, such as gathered by the access point, base station, or router 510,730, e.g., using information provided by an Orbi 510 or Arlo or both, and/or through an iPhone, wherein transcoding can then be performed, based on the gathered information.

As seen in FIGS. 19-21, several system architectures can be used to stream data to one or more recipients 820, such as through the Cloud 514, or directly through a local access point, base station, or router 730. Some system embodiments can be configured to stream information, e.g., video 806 and/or audio 808 over more than one streaming mode, such as based on delivery cost. For instance, for embodiments in which video delivery through the Cloud 514 requires payment, the delivery of the content using peer-to-peer streaming, such as through an access point, base station or router 730, can provide an alternate mechanism for delivery of the same content, with localized device feedback and transcoding.

The use of the intermediate access point, base station, or router 730,510 allows the streaming system to optimize transcoding, such as based on the connection speed of different portions of the system. For instance, as seen in FIG. 20, a wireless camera 20 and a mobile phone 828 are each connected through the access point 730, and the access point 730 can connect to the Internet, such as through the Cloud 514. As such, the access point 730 seen in FIG. 20 knows the Internet speed, as well as the link quality of Wi-Fi. In this manner, some embodiments the access point 730 know the Internet's link quality, and can therefore determine how best to transcode content streams.

Such embodiments can take into account other strengths and weaknesses throughout the system. For example, some peripheral equipment, like access points, may be limited in processing power and/or memory, to pump data at a rate that matches the Internet speed rate and/or available Wi-Fi throughput. As well, not all information is always available regarding the specific operation location of servers associated with all devices 820 (e.g., the location of a server corresponding to an Apple iOS device). In such circumstances, some embodiments of the system can calculate or estimate the relative distance of a server, e.g., by sending a trace route, such as to increase bandwidth for a close server, or to reduce bandwidth for a more distant server.

As well, some embodiments of the system can be optimized to implement other standardized streaming protocols, e.g., MPEG Dash, which is used for AT&T URL devices; and/or HLS, which is used for streaming to Apple devices. Such standardized protocols often have their own set of parameters, for which the system can be optimized to adapt. For instance, transcoding in a MPEG Dash protocol is based on a specific chunk size for specific period of time, e.g., each 2 seconds. Under such a scenario, the system can change the bit rate under circumstances in which user of a on a cell phone 828 is driving on a highway, such as to reduce the chunk size to be more adaptive to the changing communication conditions. Under conditions in which a user returns home, such that the cell phone 828 is connected through the local system access point 730, the system can then substantially increase the chunk size to be more efficient, whereby the system can send data, e.g., media 806,808 with a higher throughput.

As well, some embodiments of the system can be optimized for the transcoding used for HTTP live streaming (HLS) environments, wherein the transcoding can adapted dynamically based on one or more streaming protocols used across different portions of the architecture, and based on the hardware used and the current operating parameters.

Video Encoder Parameters.

In some embodiments of the streaming systems, such as those seen in FIGS. 19-21, the parameters used for the video encoder 804 on the wireless device or camera 20 can be changed and optimized, such as during any of development, testing, or subsequent use.

While the quality of video output from a wireless camera system can vary based on buffer size, in some embodiments, the streaming systems disclosed herein can access or otherwise get Wi-Fi information, which can be fed back to the video encoder 804, so that the video encoder 804 is not limited to reacting only to buffer size.

As well, some embodiments of the wireless devices and cameras 20 provide their own medium bit rate control, in which under some operating conditions can result in missing medium frames. As such, some embodiments are enabled to look at the rate solution, and then react or tell the camera how to adjust the bit rate, rather than letting let the camera decide on its own. For instance, some embodiments can look at the Wi-Fi information, and based on this information, communicate to the wireless camera 20 what the coding parameters should be, to adjust or optimize data flow through of the network.

Some embodiments of the streaming systems disclosed herein can also optimize their operating parameters based on the number of wireless cameras 20 that are currently implemented in the system, and which of those wireless cameras 20 are currently used. For instance, for an illustrative streaming system that includes five wireless cameras 20, there may be only three of the five wireless cameras 20 that are activated at a specific time, e.g., such as based on current conditions. Under such circumstances, the available bandwidth for the wireless cameras 20 can change as a function of the activity level of other wireless cameras 20. As such, some embodiments of the streaming system can controllably increase or decrease the uplink speed and/or image quality of a given wireless camera 20, based on the what the system can accommodate. In an illustrative scenario, the system can direct a single active wireless camera 20 to provide high quality image data 806a,806b, which the access point 730 can readily uplink to the Cloud 514. At a different time, when all five wireless cameras 20 are active, the access point 730 can be configured to direct one or more of the active wireless cameras 20 to provide image data 806 at a lower relative quality and/or at a lower bit rate.

Some embodiments of the streaming systems disclosed herein can also be optimized based on one or more operating parameters. For instance, the access point 730 can be configured to determine system capacity based on how many wireless cameras 20 are used at different times. In such a scenario, when a system that includes five wireless cameras 20 currently has two active wireless cameras 20, the access point 730 can utilize prior, i.e., solid, usage data, to determine how many retries there are, how big the packets are, and other historical data, to determine how much data can be sent through the system, as opposed to basing these parameters on the buffer size.

Based on this historical data, the encoder 804 can establish parameters, such as target bit rate and max bit rate. The encoder 804 can also be configured to control the quantization parameters for operation, such as within the range of the quantizer, i.e., he higher the quantizer goes, the worse the quality gets. Within the range, the encoder 804 can be configured to determine the minimum and maximum quantization for operation. In some embodiments, the encoder 804 can establish and/or control other parameters, such as anchor frame, delta, QP mean and QP max, frame rate, and how often by frame. In some embodiments, the encoder 804 can change other parameters, such as any of resolution, exposure, and/or filters that are applied on the initial processor.

In some streaming system embodiments, such as shown in FIGS. 19-21, the access point 730 is integrated with, i.e., dedicated, to the wireless cameras 20, and to the local clients 820, i.e., the intended recipients 820 of the content 806,808. In such embodiments, the operation of the access point 730 can be specific to the clients 820 for which it serves. During such operation, the system can function as a closed-loop, in which it can readily be determined what data, e.g., video 806, went through, and what didn't go through, and the clients 820 can be configured to provide feed back, such as over the local Wi-Fi 506.

In such integrated embodiments, the wireless cameras 20 can communicate with the access point 730, and the access point 730 can talk to the cloud 514, and/or to another access point 730. In some embodiments, the access point 730 includes a buffer, such that, if something goes wrong, the access point 730 can tell the wireless camera 20 to resend the data.

Such integrated system embodiments can offer significant advantages over access points that don't have a buffer, such as in which the wireless cameras are required to communicate directly with remote entities, e.g., a server in Massachusetts. In such a scenario, the latency is so high that adjustment of many parameters cannot be performed, e.g., only the receiver knows if it received data or not, and the inherent latency does not allow a timely resolution.

In some embodiments of the integrated streaming systems disclosed herein, not only can the Wi-Fi can be optimized on the wireless cameras 20, but on top of it, the wireless cameras 20 that are associated with the base station 730 have much better performance in the area 508. This makes it easy for the user to set up the system in their home 508, because the user does not have to worry about the use of a generic access point, because the access point 730 is specifically optimized to work in conjunction with the wireless cameras 20, and can readily be configured to work seamlessly with the local wi-fi 506 and with external systems, e.g., the Cloud 514.

The streaming systems disclosed herein typically have a different set of parameters for night vision, i.e., low light conditions. Under such circumstances, the automatic gain control of the wireless cameras 20 can increase the analog or digital gain, such that the image 802 or video 806 becomes very noisy. Under such circumstances, the system can adjust any of the bit rate or gain, such as to reduce the noise and to retain an acceptable bit rate.

As well, some embodiments of the integrated streaming systems disclosed herein can be optimized, through hardware and/or software, to operate over a wide temperature range, while retaining acceptable image quality. For instance, because the integrated streaming systems can operate as a real-time system, they can be configured to respond rapidly to local thermal conditions, e.g., when the system detects a predetermined level of thermal noise, the system can react by chilling the image sensor 322, e.g., an CCD sensor 322, to decrease the thermal noise.

In some embodiments of the integrated streaming systems disclosed herein, the system can adjust pixel size to reduce noise. For example, under night vision conditions, the output resolution can be decreased, e.g., from 4 Megapixel (MP) to 1 MP, while maintaining the CCD size. Under such conditions, the system can use more photons to create a selected portion of an image, e.g., using four cells instead of one cell. Under such a scenario, if the system determines that the bit rate is too high, it can combine the image information between cells, to optimize the image output.

Some embodiments of the integrated streaming systems disclosed herein can also compensate for the current state of the battery for the wireless cameras 20. Under such a scenario, in which the state of a wireless camera 20 is fed back to the base station 730, if the remaining power of camera battery is limited, i.e., almost gone, the transmission of high quality videos may result in dropping the wireless camera 20 offline. To compensate for this, the system can controllably reduce the image quality from that wireless camera 20, so that the system can receive images from that wireless camera 20 for a longer period of time.

The mesh-based streaming systems disclosed herein are readily adaptable to provide a wide variety of features. For instance, the systems can be integrated with multiple access points 730, base stations 510, and/or wi-fi 506, such as to provide new functionalities as a part of home security, e.g., any of smoke detection, motion triggers, lighting, speakers, prompts, fingerprint detection, doorbells, water sensors, or other security detection and functions.

As seen in FIG. 21, the mesh-based streaming system can include local storage 862, such as to store videos 866 locally. In such a system, network storage can be connected through a mesh point, which has sufficient processing power, i.e., a good CPU.

While some embodiments of the mesh-based streaming systems disclosed herein are associated with captured video 806 that is delivered through the Cloud, 514, with user notification to view the captured video 806, other embodiments can call the user, such as by sending a Facetime call or a Google Hangout call. For instance, if someone is at the user's door, the system can be configured to call the user, and then allow peer-to-peer media streaming 806,808 for the user.

In some embodiments of the mesh-based streaming systems disclosed herein, the wireless cameras 20 can include different types of radios, e.g., 2.5 GHz, 5 GHz, etc., which can be selectively powered, based on the transmission requirements. For instance, the use of the radios can be optimized, such as to use one at a time, or two at a time, depending on the application. In such a scenario, one of the wireless cameras 20 that is located at quite a distance from an access point 730 may transmit over 2 GHz, while other wireless cameras 20 that are closer to the access point can operate at 5 GHz.

In some embodiments of the mesh-based streaming systems disclosed herein that include local storage 862, instead of simply sending video 806 all the time to the cloud, the video 806 can be preserved at the local storage 862. Under such a scenario, even if image delivery fails initially, the video 806 can still be sent or recovered at a later time, over one or more channels. As well, some embodiments of the access point 730 can include multiple radios, such as for any of providing a dedicated back-channel, for balancing traffic for client delivery, such as based on current interference, or for spreading spectrum, such as by hopping between bands.

In some embodiments, the encoders 804 associated with the wireless cameras 20 and/or the access points 730 can flexibly be configured to send multiple streams 806 of video concurrently, e.g., one stream 806a at very high data rate, and one stream 806b at a lower rate. For instance, multiple radios at a wireless camera 20 or an access point 730 can be available for different uses. Under such a scenario, if someone breaks into a user's home, the system can be configured to send a very high bit rate band to the network-attached storage 862 (to capture and store all the details), and send lower bit images to the user's phone 828, so the user knows what happened, after which the user can retrieve the high-quality video files 866, such as to provide to law enforcement personnel.

In some embodiments, various types of protocols defined in 3GPP can be used. For instance, below 6 GHz or MM Wave physical layers from 3GPP can be used. The cellular based protocols can be used as back up to Wi-Fi or other wireless protocols for last hop. Moreover, 3GPP based protocols can be used as back up to other forms of internet access including data over cable service interface specification {DOCSIS) or DSL.

Figure 22:
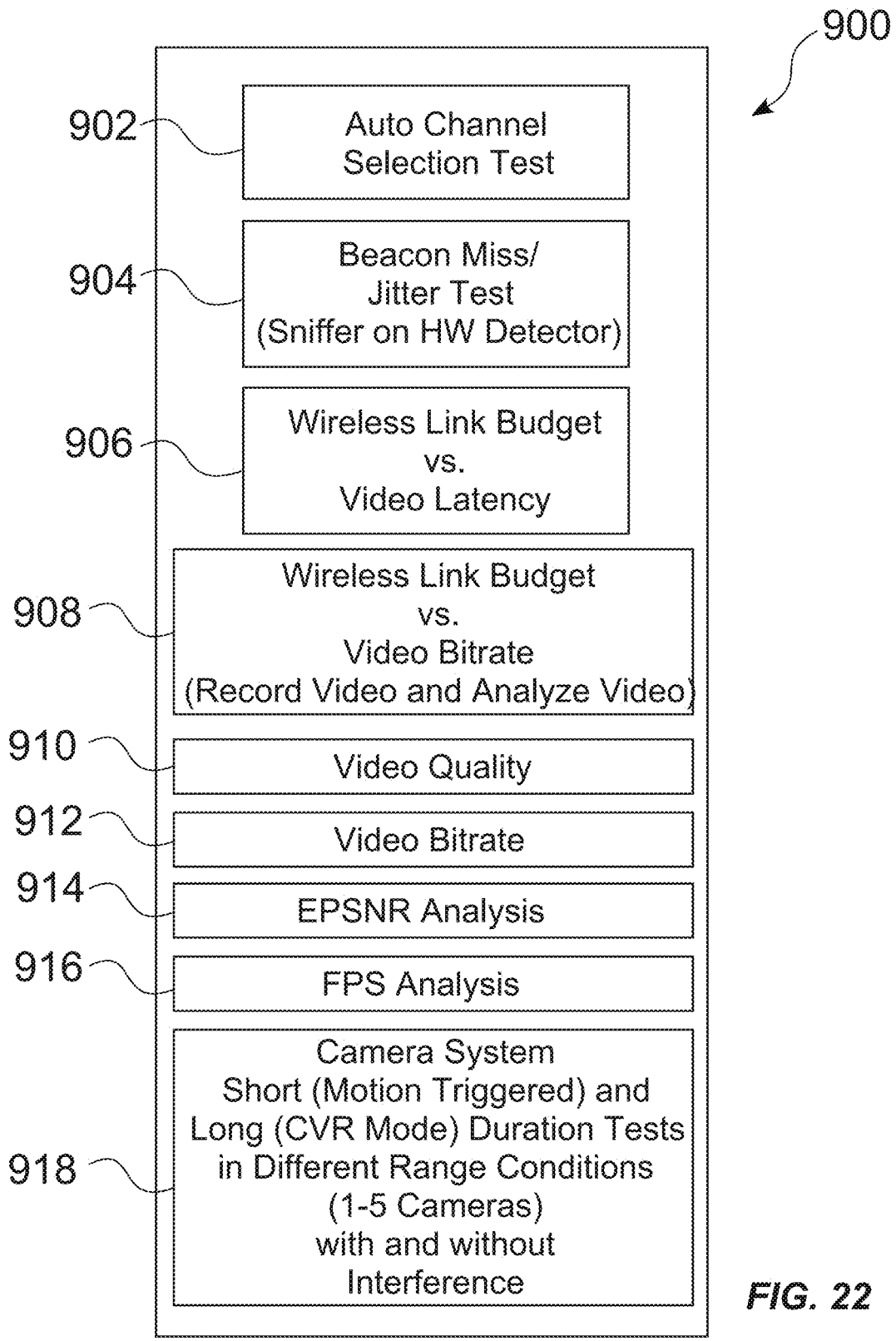
FIG. 22 is a schematic diagram of different system level tests for a wireless camera.

FIG. 22 is a schematic diagram 900 of different system level tests that can be performed on one or more wireless cameras 20, e.g., Arlo, and related systems, as disclosed herein. For instance, the system levels tests can include any of automated channel selection tests 902, beacon miss/jitter tests 904, such as performed by a sniffer or a hardware detector, wireless link budget versus video latency testing 906, wireless link budget versus video bitrate testing 908, such as performed by recording and analyzing video, video quality testing 910, video bitrate testing 912, estimated peak signal to noise ratio (EPSNR) analysis 914, and FPS analysis 916. In some embodiments, the testing and/or analysis can be performed by one or more video analysis tools, such as available through Elecard, of Tomsk, Russia; Cupertino, Calif. USA; and Guangzhou, China.

Figure 23:
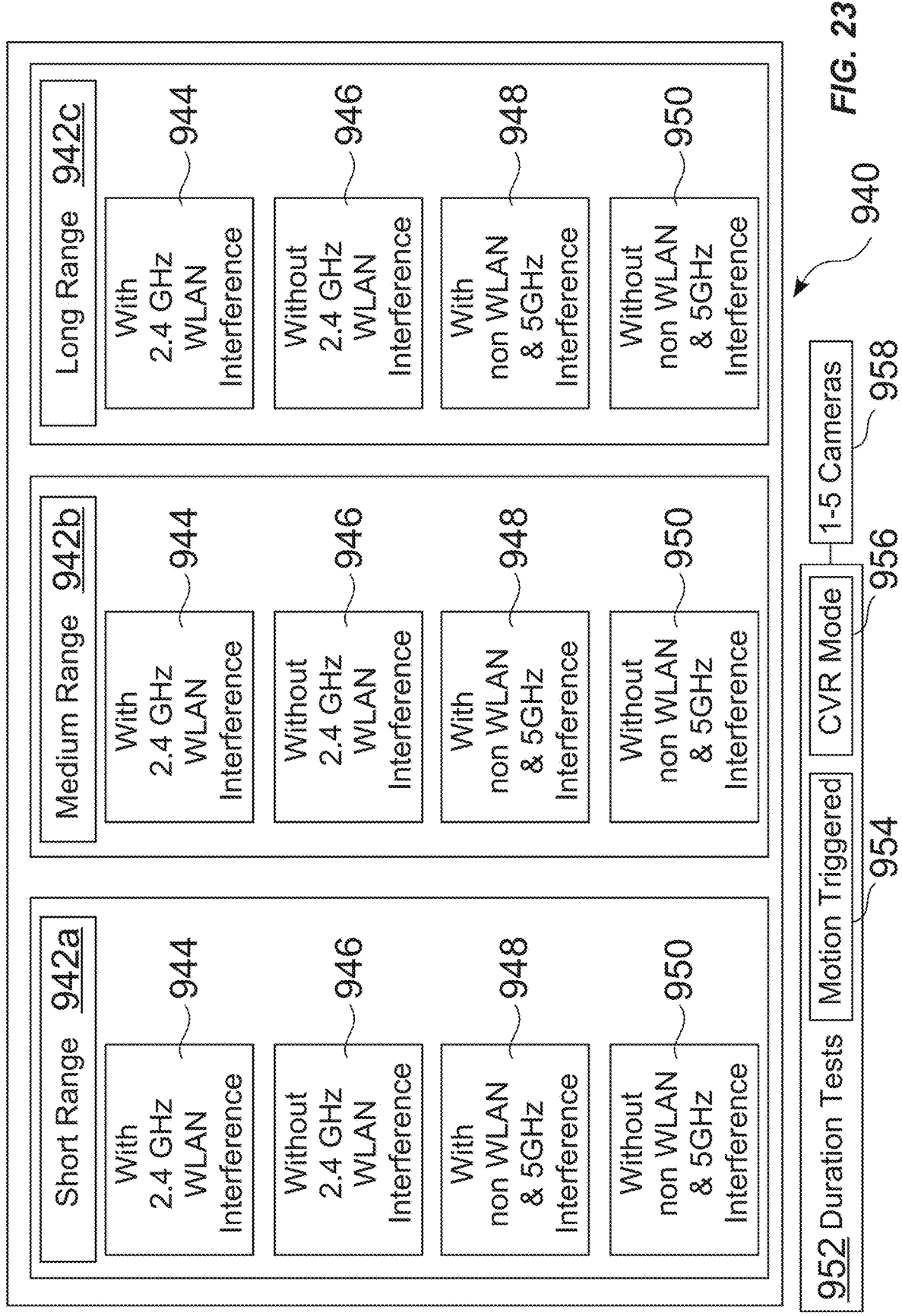
FIG. 23 is a schematic diagram of an illustrative test matrix for testing one or more wireless cameras, under different operating conditions.

As also seen in FIG. 22, one or more wireless cameras, e.g., Arlo cameras, can be tested 918 under different operating conditions. FIG. 23 is a schematic diagram of an illustrative test matrix 940 for testing 918 one or more wireless cameras 20, e.g., Arlo cameras 20, under different operating conditions. For instance, in a current embodiment, a camera system that includes one to five wireless Arlo cameras 20 can be tested for duration 952, e.g., such as for any of triggered mode short duration operation 954 and continuous video recording (CVR) mode long duration operation 956, under one or more range conditions, e.g., short range 942a, medium range 942b, and long range 942c. In some embodiments, for each of short range 942a, medium range 942b, and long range 942c, testing can be performed with 2.4 GHz WLAN interference 944, without 2.4 GHz WLAN interference 946, with non WLAN & 5 GHz interference 948, or without non WLAN & 5 GHz interference 948.

Figure 25:
FIG. 25 is a second view of an illustrative RAS wireless RvR setup for wireless camera testing.
Figure 26:
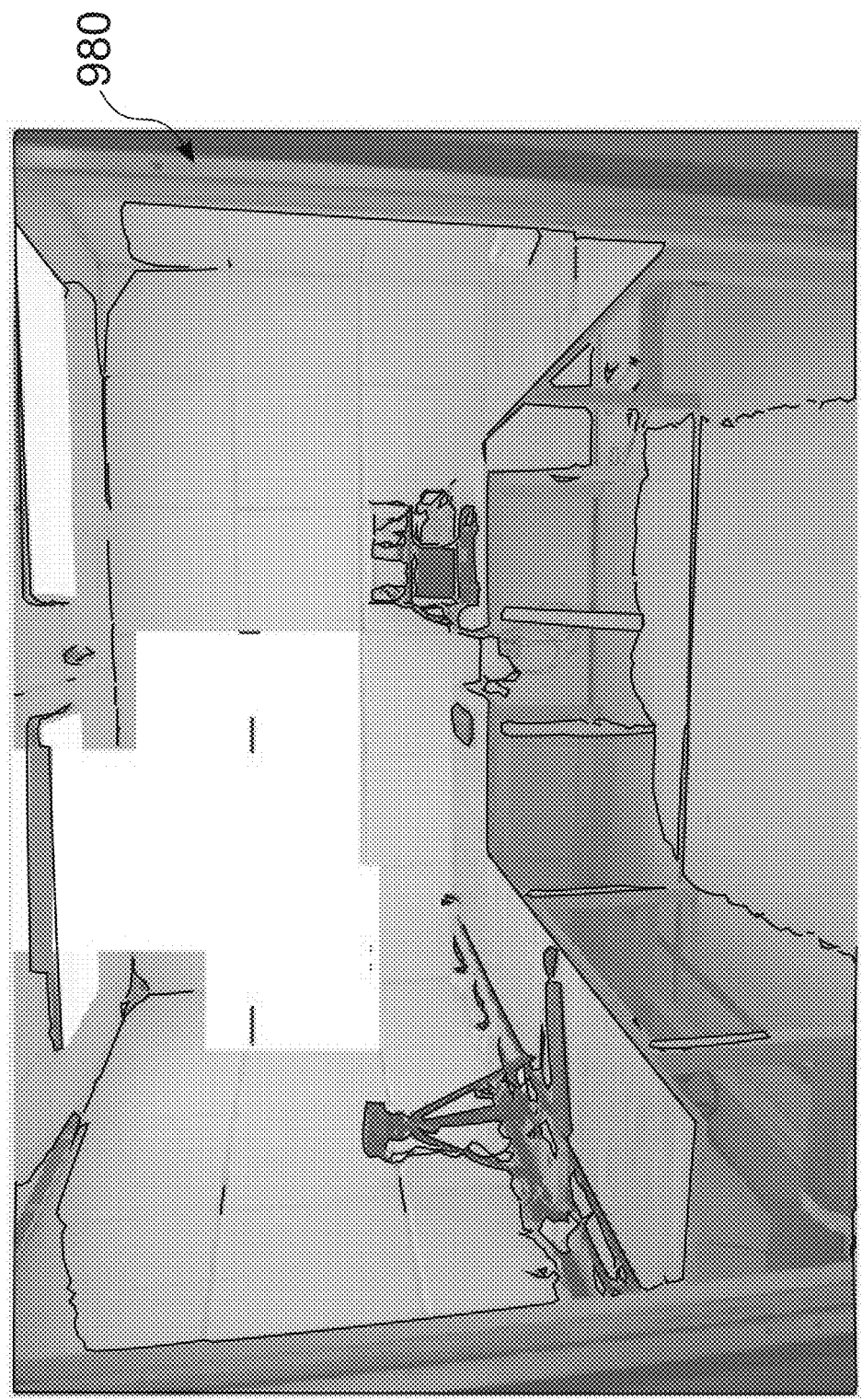
FIG. 26 shows an illustrative test setup for a wireless security camera system, e.g., an Arlo system, having one to five cameras, at close range.
Figure 27:
FIG. 27 shows an illustrative test setup for a wireless security camera system, e.g., an Arlo system, having one to five cameras, at mid and long range.

FIG. 24 is a first view of an illustrative remote alarm system (RAS) wireless range versus rate (RvR) setup 960 for wireless camera testing. FIG. 25 is a second view of an illustrative RAS wireless RvR setup 970 for wireless camera testing. FIG. 26 shows an illustrative test setup 980 for a wireless security camera system, e.g., an Arlo system, having one to five wireless cameras 20, at close range 942a. FIG. 27 shows an illustrative test setup 990 for a wireless security camera system, e.g., an Arlo system, having one to five wireless cameras 20, at mid-range 942b and long range 942c.

The test systems and methods disclosed herein can be used to test and evaluate how one or more wireless cameras 20 perform, such as at different distances between the access point 510 and the wireless cameras 20. For instance, the test systems 11 can test one wireless camera 20 at a time, or two wireless cameras 20 at a time, or N wireless cameras at a time, to determine how the wireless cameras 20 behave. As well, some embodiments of the test systems 11 can also perform systematic testing.

Some testing embodiments include a test schedule for the routers, e.g., 42a,42b (FIGS. 1,2), in which the throughput is determined under different conditions, e.g., the peak throughput, or the maximum range that can be covered at a certain throughput. Under some testing scenarios, latency and/or dropped packets is not considered, such as for systems that would use TCP communication.

Some testing embodiments include testing and optimization of the setup for the wireless cameras 20, such as including wireless rate/delay with interference testing. For instance, instead of just performing throughput testing, one or more wireless cameras 20 can be placed inside a test chamber 222, e.g., 222a, 222b (FIGS. 9,10), and then the test system can emulate the patterns and/or the distance between an access point 42,730 and the wireless cameras 20. In contrast to determining throughput, the test system can be used to determine how a wireless camera 20 reacts, such as for a given fixed bit rate. For instance, when a wireless camera 20 is set to 1.5 megabit bitrate, or 3 megabit bit ate, it can be determined what range conditions at which the set bit rate is preserved, such as by increasing the range, and determining where the set bit rate fall off. Such testing and results can yield qualitative data, beyond that of basic quantitative data, e.g., support for 2 megabit, 3 megabit.

Some testing embodiments include testing and optimization of range. For instance, in operation, as the bit rate becomes low all the buffer become slow; and delay becomes is increased. In some embodiments of range testing, a timer is placed inside the chamber itself, in view of the wireless camera 20, such that the displayed time, as captured by the wireless camera 20, can be compared to a time reference. Under such a scenario, close range testing would typically yield no delay, and the range can be increased to analyze where and how the delay occurs.

Some testing embodiments also include performing range testing with respect to the video, range testing with respect to the delay, with or without a controlled interference, controlled with the same environment. As such, it can be determined how the wireless camera 20 and system reacts the applied interference, e.g., 2.4 GHz interference.

In some embodiments, the output of such interference testing can help to optimize system operation. For example, a wireless camera 20 that operates on multiple bands can be configured to switch bands if packets cannot get through, e.g., by switching to 5 gigahertz transmission from a 2 gigahertz band.

As noted above, while basic testing may be associated with a single wireless camera 20, one or more additional cameras 20 can be added and tested together, such as to test and optimize the protocol when multiple wireless cameras 20 operate together. Such testing can determine how time is handled between multiple wireless client cameras 20, whether each wireless client camera 20 is able to get a band per time, and at the same time the range is increased, the latency and the input can also be determined and optimized as desired.

Some testing embodiments also include performing testing based on the available battery power of the wireless cameras 20, such as to determine the actual DC power consumed by the one or more wireless cameras 20, under different operating conditions, such as based on interference conditions, range, operation over different bands, and/or other operating conditions.

In addition, some testing embodiments also include different video quality testing of one or more wireless cameras 20 under different operating conditions, such as based on any of motion, bit rate, target bit, and/or maximum bit rate.

Some embodiments of the testing system can be configured to establish and create an integrated setup for testing wireless-centric operation, such as beyond that of testing a single device or wireless camera 20. For instance, one or more components of a wireless system, as disclosed herein can be established within a shielded room, which can then be used to create day, night scenes with total wireless isolation. To this testing environment, a wide variety of interference or impingements can be added, such as to include stationary items, e.g., furniture, walls, trees and plants, etc., and movable items, e.g., fans, one or more robots. etc. The addition of motion can require the wireless cameras to process images differently, in which the bit rate is increased.

Some embodiments of the testing system can be configured to test and optimize the use of beacons, such as transmitted from an access point 730 or a Wi-Fi router 510, to wake up and activate a low-power wireless camera 20. For example, the system can test wireless cameras that are configured to wake up by the Nth beacon of the Nth beacon only, in which the Nth beacon becomes very critical. If the camera 20 doesn't see the Nth beacon when it wakes up, it has to stay wake up until it reaches, receives the next beacon, which requires more power. Beacon testing can also be performed to determine if the beacon transmission is good, i.e., always on time; and always on real time, and whether any beacons are lost or include jitter, which can reduce the battery life of the wireless cameras 20.

Some embodiments of the testing system include special hardware, e.g., a log detector, such as for a radius of operation. For instance, an AM detector can provide a data slice, e.g., a periodic pulse; by which to produce the beacons, e.g., every second or 10 second, or one hour, to result in a specified number of beacons. The use of a counter can detect the beacons, which can readily be compared to the known count of transmitted beacons. The test system can also include a Wi-Fi sniffer to be used to determine if there is bean loss, and/or if a beacon is going bad, which can adversely affect a low-power application, such as used with the wireless devices and cameras 20.

Some embodiments of the testing system can include audio testing, such as related to audio sensing 808 with the wireless devices and cameras 20 or other audio input. Such testing can include any of determination of audio signals, the audio as input to the wireless device or camera 20, the sensitivity of the microphone, the detection and demodulation of pulses feeding into the microphone, or the amplification of such pulses that can result in noise. As such, some test systems can perform across the range, such as to determine how duty cycle of the Wi-Fi signal will vary. For instance, at a close range, the audio 808 can be sent at a higher bit rate, either in or outside of an audible range. As the range is swept, the duty cycle of the AR time varies, and fault conditions can be captured.

As well, some embodiments of the testing system can provide for the control and testing of different uplink and downlink speed. For example, some embodiments allow the speed of the uplink to be set and tested, such as for systems that include one or more wireless devices and cameras 20. For instance, for a given system having an uplink set at 3 megahertz, the uplink performance can be tested during operation of a single wireless device or camera 20, and can also be tested during concurrent operation of multiple devices and cameras 20, e.g., 2-5 wireless cameras 20, such as to see how an access point 730 reacts to the receipt of multiple uplink signals.

Furthermore, some embodiments of the testing system can include one or more video displays, such as to display still image or video signals using different formats and resolutions, to be captured by the wireless devices and cameras 20. For instance, a high resolution feed, e.g., having a 4k resolution from a Blu Ray source, can have a 5 gigabit or 10 gigabit, bit rate, depending on the video source. In some testing environments, the video is delivered through optical fiber transmission, such as from one source into multiple test chambers, by which the test system can accurately test the same information, i.e., the same content, by which the input is identical and by which the test system, can repeatedly analyze comparative processing of the same content.

As discussed above, some embodiments of wireless devices and cameras 20, access points 730, and or wi-fi routers 510 can be configured to operate over multiple bands. As such, some embodiments of the test systems are configured to control operation and testing over multiple-bands, e.g., simultaneous dual-band operation at different capacities, such as up to maximum bit rate operation over dual bands.

In summary, the wireless device test capabilities can include any of: single device, wireless video rate/delay/interference test; multi-security camera system wireless DC power range tweet with and without noise/interference; security camera system image quality with and without movement in day and night mode; multi-camera wireless range vs. DC power tweet with and without interference; WLAN beacon/sniffer automation; wireless audio range testing; security camera uplink testing; and optical synchronized video/audio distribution (optical fiber).

Computer System.

Figure 28:
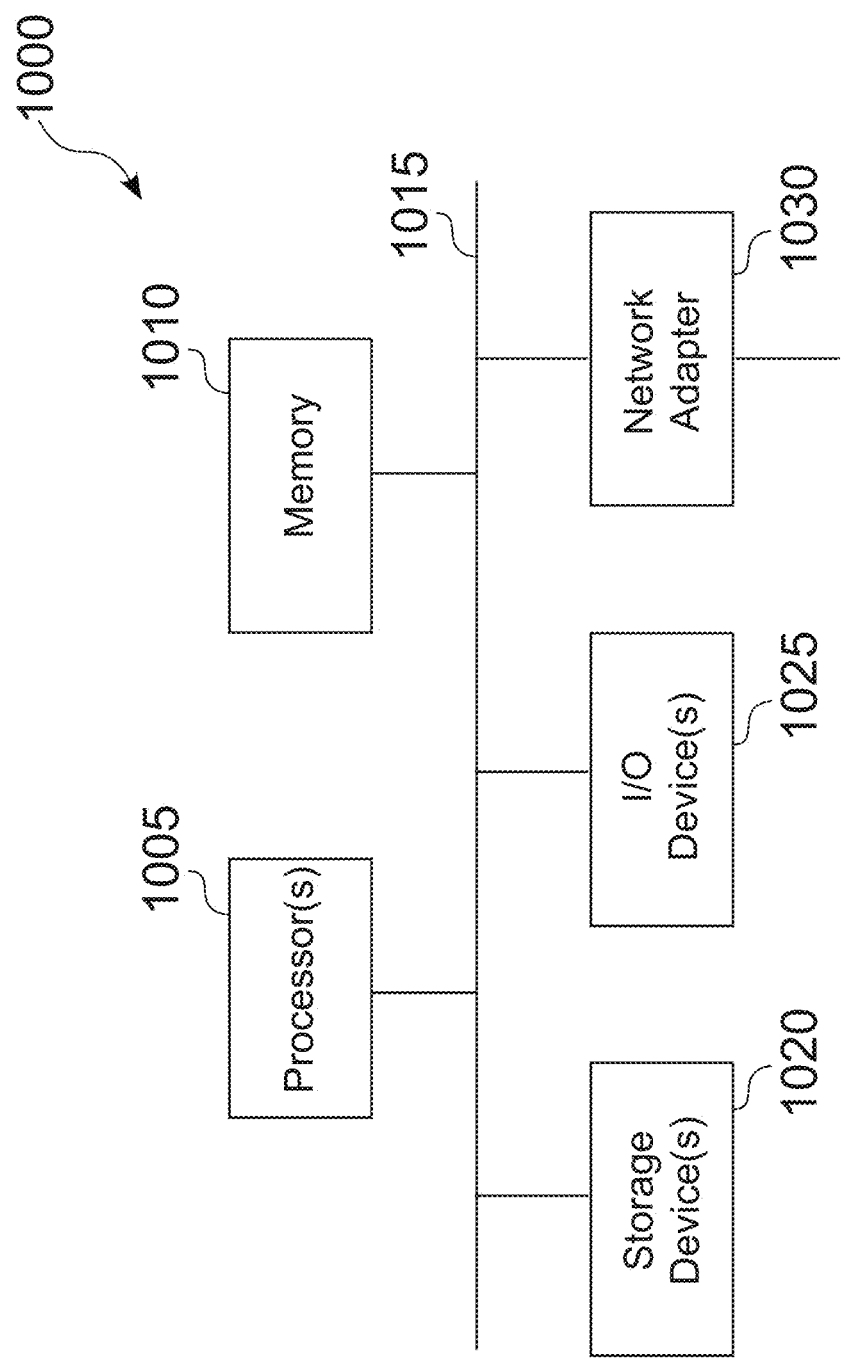
FIG. 28 is a block diagram of a computer system as may be used to implement certain features of some of the embodiments.

FIG. 28 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 1000 may include one or more central processing units ("processors") 1005, memory 1010, input/output devices 1025, e.g. keyboard and pointing devices, touch devices, display devices, storage devices 1020, e.g. disk drives, and network adapters 1030, e.g. network interfaces, that are connected to an interconnect 1015. The interconnect 1015 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 1010 and storage devices 1020 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 1010 can be implemented as software and/or firmware to program the processor 1005 to carry out actions described above. In some embodiments, such software or firmware may be initially provided to the processing system 1000 by downloading it from a remote system through the computing system 1000, e.g., via network adapter 1030.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system for testing at least one wireless device under test (DUT), comprising:
    a test chamber for receiving the wireless device;
    an access point for receiving wireless signals from the wireless device, and for sending wireless signals to the wireless device;
    a mechanism for emulating distance between the access point and the wireless device within the test chamber; and
    a mechanism for testing operation of any of the access point and the DUT at one or more emulated distances, under one or more operating conditions.

2. The system of claim 1, wherein the testing includes testing of a single wireless device under the one or more operating conditions.

3. The system of claim 1, wherein the testing includes wireless video rate testing of one or more of the wireless devices as a function of any of delay or interference.

4. The system of claim 1, wherein the testing includes testing of automatic channel selection for one or more of the wireless devices.

5. The system of claim 1, wherein the testing includes testing of beacons or probes transmitted from one or more of the wireless devices under one or more of the operating conditions.

6. The system of claim 1, wherein the testing includes testing wireless link budget as a function of video latency between the one or more of the wireless devices and the access point.

7. The system of claim 1, wherein the testing includes testing wireless link budget as a function of video bitrate between the one or more of the wireless devices and the access point.

8. The system of claim 1, wherein the testing includes video quality testing of one or more of the wireless devices.

9. The system of claim 1, wherein the testing includes video bitrate testing of one or more of the wireless devices.

10. The system of claim 1, wherein the testing includes estimated peak signal to noise ratio (EPSNR) analysis of one or more of the wireless devices.

11. The system of claim 1, wherein the wireless devices are wireless cameras, and wherein the testing includes motion triggered tests of one or more of the cameras, with and without interference.

12. The system of claim 11, wherein the testing is performed under different light conditions.

13. The system of claim 1, wherein the wireless devices are wireless cameras, and wherein the testing includes long duration tests of one or more of the cameras, with and without interference.

14. The system of claim 13, wherein the testing is performed under different light conditions.

15. A method for testing one or more wireless devices under test (DUTs), comprising:
    placing the one or more wireless DUTs within a test chamber, wherein the wireless DUTs can send wireless signals to an access point, and can receive wireless signals from the access point;
    emulating distance between the access point and the wireless DUTs within the test chamber; and
    testing operation of any of the access point and the wireless DUTs at one or more of the emulated distances, under one or more operating conditions
    wherein the one or more wireless devices include a wireless camera, and wherein the testing includes long duration tests of the camera, with and without interference.

16. The method of claim 15, wherein the testing includes testing of a single wireless device under the one or more operating conditions.

17. The method of claim 15, wherein the testing includes wireless video rate testing of one or more of the wireless devices as a function of any of delay or interference.

18. The method of claim 15, wherein the testing includes testing of automatic channel selection for one or more of the wireless devices.

19. The method of claim 15, wherein the testing includes testing of beacons or probes transmitted from one or more of the wireless devices under one or more of the operating conditions.

20. The method of claim 15, wherein the testing includes testing wireless link budget as a function of video latency between the one or more of the wireless devices and the access point.

21. The method of claim 15, wherein the testing includes testing wireless link budget as a function of video bitrate between the one or more of the wireless devices and the access point.

22. The method of claim 15, wherein the testing includes video quality testing of one or more of the wireless devices.

23. The method of claim 15, wherein the testing includes video bitrate testing of one or more of the wireless devices.

24. The method of claim 15, wherein the testing includes estimated peak signal to noise ratio (EPSNR) analysis of one or more of the wireless devices.

25. The method of claim 15, wherein the wireless devices are wireless cameras, and wherein the testing includes motion triggered tests of one or more of the cameras, with and without interference.

26. The method of claim 25, wherein the testing is performed under different light conditions.

27. The method of claim 15, wherein the testing is performed under different light conditions.

28. A wireless system, comprising:
    a wireless access point; and
    one or more wireless cameras configured to send wireless signals to an access point, and receive wireless signals from the access point, wherein the wireless signals sent to the access point include video signals;
    wherein the operation any of the access point and the wireless devices is optimized based on testing the access point and the wireless devices in a test environment that is configured to emulate distance between the wireless devices and the access point.

* * * * *